United States Patent
Yokoyama

(10) Patent No.: US 7,174,098 B2
(45) Date of Patent: Feb. 6, 2007

(54) APPARATUS AND METHOD FOR MONITORING OPTICAL SIGNAL

(75) Inventor: Yoshitaka Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 586 days.

(21) Appl. No.: 10/739,060

(22) Filed: Dec. 19, 2003

(65) Prior Publication Data

US 2004/0131369 A1 Jul. 8, 2004

(30) Foreign Application Priority Data

Dec. 24, 2002 (JP) ............................. 2002-371332
Dec. 17, 2003 (JP) ............................. 2003-418945

(51) Int. Cl.
*H04B 10/08* (2006.01)

(52) U.S. Cl. ............................ 398/33; 398/25; 398/26; 398/27; 398/29; 398/34; 398/38; 398/81; 398/93; 398/94; 398/95; 398/147; 398/148; 398/152; 398/154; 398/155; 398/158; 398/159; 398/161; 398/183; 398/192; 398/195; 398/198; 398/208; 398/209; 385/24; 385/37

(58) Field of Classification Search ................. 398/33, 398/25, 26, 27, 29, 34, 38, 81, 93, 94, 95, 398/147, 148, 152, 154, 155, 158, 159, 161, 398/183, 192, 195, 198, 208, 209; 385/24, 385/37

See application file for complete search history.

(56) References Cited

U.S. PATENT DOCUMENTS 6,411,416 B1 * 6/2002 Ooi et al. .................. 398/141
6,681,081 B2 * 1/2004 Mao .......................... 398/147

FOREIGN PATENT DOCUMENTS

JP 11-68657 3/1999

OTHER PUBLICATIONS

N. Hanik, et al., "Application of amplitude histograms to monitor performance of optical channels", Electronics Letters, Mar. 4, 1999, vol. 35 No. 5, pp. 403-404.

* cited by examiner

*Primary Examiner*—Hanh Phan
(74) *Attorney, Agent, or Firm*—McGinn IP Law Group, PLLC

(57) ABSTRACT

This invention provides a technique for realizing low-cost optical signal waveform monitoring with improved real-timeness to be applied to signal quality monitoring in an actual optical transmission system, and a technique for stably controlling an optical transmitter/receiver and various compensators by means of this waveform monitoring. Opening/closing of a optical gate is controlled by means of a clock signal synchronized with an optical signal input from a photocoupler and having a period equal to the bit interval of data or N (N: a positive integer) times longer than the bit interval to allow each pulse of the optical signal for one bit of data to pass through the optical gate for only part of the time width of the gate. A photoelectric conversion element to which the optical signal transmitted through the optical gate for only part of the time width obtains an average light intensity of the input optical signal. Information on this average light intensity is output to a monitoring output section.

16 Claims, 24 Drawing Sheets

APPLIED VOLTAGE

INPUT ELECTRIC CLOCK SIGNAL

OUTPUT OPTICAL CLOCK SIGNAL

APPLIED VOLTAGE

INPUT ELECTRIC CLOCK SIGNAL

OUTPUT OPTICAL CLOCK SIGNAL

APPARATUS AND METHOD FOR MONITORING OPTICAL SIGNAL

BACKGROUND OF THE INVENTION

1. Field of the Invention

The present invention relates to an apparatus and method for monitoring an optical signal in a high-speed large-capacity optical communication system.

2. Description of the Prior Art

With the increase in demand for communications, optical communication systems are increasing rapidly in capacity. Under circumstances where the transmission capacity per optical fiber is increased to the order of terabits by using wavelength division multiplexing (WDM), there is a need to increase the signal speed per wavelength in order to further increase the capacity. The development of techniques for high-speed signal transmission at a rate of 40 Gbits/s or higher is being pursued. Monitoring processing on a degraded waveform is conceivable as a means for realizing long-distance transmission of a high-rate signal of 40 Gbits/s or higher, which can be easily affected by dispersion in an optical fiber and nonlinearity of the optical fiber, and the waveform of which can degrade easily in comparison with a low-rate signal. In particular, chromatic dispersion or polarization mode dispersion in a transmission path fiber changes with time due to a change in temperature of the fiber for example. Under the influence of such changing dispersion, the possibility of the Q-value being reduced is high. It is, therefore, important to realize real-time monitoring of chromatic dispersion and polarization mode dispersion and control of compensation for such dispersions.

Several methods for directly measuring the value of chromatic dispersion or polarization mode dispersion have been proposed. For example, a method of estimating a dispersion value from the intensity of a clock frequency component which is contained in an optical signal has been proposed (see patent document 1).

It is thought that limitation of the reduction in Q-value by monitoring a signal waveform in a real-time manner and by controlling a compensator for compensation for chromatic dispersion, polarization mode dispersion or the like is also effective.

A typical example of means for monitoring the waveforms of optical signals is a sampling oscilloscope which is capable of observing a high-speed signal waveform at a low sampling frequency, and which is ordinarily used as a measuring apparatus for signal waveform evaluation of high-speed electric and optical devices, etc.

Further, as a means for extracting waveform information in a simpler manner in comparison with the sampling oscilloscope, an amplitude histogram method has been proposed. For example, waveform degradation due to noise, crosstalk, or chromatic dispersion is observed from a light intensity distribution extracted by asynchronous sampling (see non-patent document 1). Extraction of a clock signal from data is not required for this method since data is sampled in an asynchronous manner. Therefore, this method has the advantages of using a simplified apparatus and enabling measurement theoretically independent of the bit rate of the signal.

[Patent Document 1]
    Japanese Patent Laid-Open No. 11-68657

[Non-Patent Document 1]
    Electronics Letters, 1999, 35, pp. 403 and 404

The above-described techniques, however, have problems described below.

In the case of the method of estimating a dispersion value from the intensity of a clock frequency component contained in an optical signal, the state of waveform degradation cannot be determined with accuracy and there is a problem in terms of accuracy of control, because the change in clock output intensity with respect to a change in dispersion is small. Moreover, a special clock extraction circuit is required for monitoring of the clock intensity and a phase-locked loop (PLL) circuit ordinarily used as a clock extraction circuit cannot be used.

In optical waveform monitoring on an optical signal using a sampling oscilloscope, the scale of an apparatus for monitoring a signal in an actual communication system is so large that an application of this monitoring to an optical receiver is not practicable. The amount of data obtained by a sampling oscilloscope is considerably large and the cost of signal processing for extracting suitable parameters is high. A comparatively long time is required to depict a waveform for a reason in terms of principle, which is a problem with use of this technique for real-time control. In the case of observation of an actual high-speed optical waveform, it is necessary that each of optical and electrical devices used in the sampling oscilloscope have a sufficiently wide frequency band, and the cost of preparation of high-speed devices is considerable. If some of the optical and electrical devices do not have a sufficiently wide frequency band, the observed waveform may become different from the desired form, depending on the optical and electrical devices, and it is difficult to correctly perform analysis or to extract correct information.

In the case of the amplitude histogram method, the same performance as that of a sampling oscilloscope is required. For example, it is necessary that a device for receiving an optical signal have a characteristic of a sufficiently wide band, and that the width of a sampling gate be sufficiently narrow, although sampling is performed in an asynchronous manner. Therefore, an excessively large cost is required for application of this method to an actual system. There are also the same problems as those with a sampling oscilloscope, e.g., the problem that the cost for signal processing is large and the time required for information extraction is long. Further, it is difficult to observe variation in the time direction, e.g., spreading of signal pulses by using this means.

SUMMARY OF THE INVENTION

Therefore, an object of the present invention is to provide a technique for realizing low-coast optical signal waveform monitoring with improved realtimeness to be applied to signal quality monitoring in an actual optical transmission system. Another object of the present invention is to provide a technique for stably controlling an optical transmitter/receiver and various compensators by means of this waveform monitoring.

According to the invention as set forth in claim 1, an apparatus for monitoring information on the waveform of an optical signal has a photocoupler which introduces an input optical signal into a branch path, extraction means for extracting, from the optical signal introduced into the branch path by the optical coupler, a clock signal synchronized with the optical signal, a optical gate which controls timing of opening and closing of a gate on the basis of the clock signal extracted by the extraction means to control transmission and non-transmission of the optical signal introduced into the branch path by the photocoupler, adjustment means for adjusting the phase difference from the optical signal of the clock signal extracted by the extraction means, detection means for detecting the intensity of light of the optical signal transmitted through the optical gate on the basis of the clock signal phase-difference-adjusted by the adjustment means, and waveform information extraction means for extracting information on the waveform of the optical signal on the basis of the light intensity detected by the detection means.

According to the invention as set forth in claim 2, the optical gate in the invention as set forth in claim 1 is constituted by an electro-absorption-type semiconductor modulator.

According to the invention as set forth in claim 3, the adjustment means in the invention as set forth in claim 1 is constituted by an optical delay circuit which is provided between the photocoupler and the optical gate, and which changes the delay time of the optical signal input to the optical gate.

According to the invention as set forth in claim 4, the adjustment means in the invention as set forth in claim 1 is constituted by an optical delay circuit which is provided between the photocoupler and the extraction means, and which changes the delay time of the optical signal input to the extraction means.

According to the invention as set forth in claim 5, the adjustment means in the invention as set forth in claim 1 is constituted by a delay circuit which changes the phase of the clock signal for controlling timing of opening and closing of the optical gate.

According to the invention as set forth in claim 6, the optical signal monitoring apparatus as set forth in claim 1 has an optical receiver incorporating a clock extraction circuit, and the extraction means is constituted by the clock extraction circuit in the optical receiver.

According to the invention as set forth in claim 7, the optical signal monitoring apparatus as set forth in claim 1 has means for extracting information on waveform degradation due to dispersion of the optical signal on the basis of the waveform information extracted by the waveform information extraction means.

According to the invention as set forth in claim 8, the optical signal monitoring apparatus as set forth in claim 1 has a polarizing element between the photocoupler and the optical gate.

According to the invention as set forth in claim 9, the optical signal monitoring apparatus as set forth in claim 1 has, between the photocoupler and the optical gate, a polarization controller which controls the direction of polarization of the optical signal, and a polarizing element which limits the direction of polarization of the optical signal to the optical gate.

According to the invention as set forth in claim 10, the optical signal monitoring apparatus as set forth in claim 1 has a variable dispersion compensator which compensates for chromatic dispersion of the optical signal, and the waveform information extraction means is arranged to control the variable dispersion compensator on the basis of information on a chromatic dispersion value in the extracted waveform information.

According to the invention as set forth in claim 11, the optical signal monitoring apparatus as set forth in claim 1 has a polarization mode dispersion compensator which compensates for polarization mode dispersion of the optical signal, and the waveform information extraction means is arranged to control the polarization mode dispersion compensator on the basis of information on a detected polarization direction dependence in the extracted waveform information.

According to the invention as set forth in claim 12, a method of monitoring information on the waveform of an optical signal by using an optical signal monitoring apparatus having a optical gate has (a) a step of extracting from the optical signal a clock signal synchronized with the optical signal for the purpose of controlling timing of opening and closing of the optical gate, (b) a step of controlling transmission and non-transmission of the optical signal through the optical gate on the basis of the clock signal extracted in the step (a), (c) a step of adjusting the phase difference of the clock signal from the optical signal, (d) a step of detecting the intensity of light of the optical signal transmitted through the optical gate on the basis of the clock signal phase-difference-adjusted in the step (c), and (e) a step of extracting information on the waveform of the optical signal on the basis of the light intensity detected in the step (d).

According to the invention as set forth in claim 13, the step (b) in the invention as set forth in claim 12 includes a step of controlling the direction of polarization of the optical signal before control of transmission and non-transmission of the optical signal.

According to the invention as set forth in claim 14, in the invention as set forth in claim 12, the optical signal monitoring apparatus further has an optical receiver, and the step (e) includes a step of extracting the rate of change in an optimum discrimination threshold level in the optical receiver from an amount of change in the waveform information, and a step of adjusting the discrimination threshold level in the optical receiver on the basis of the extracted amount of change.

According to the invention as set forth in claim 15, the step (c) in the invention as set forth in claim 12 includes a step of detecting information on the optical waveform of consecutive N bits by performing control so that the frequency of the clock signal synchronized with the optical signal is 1/N (N: a positive integer) of the bit rate of the optical signal.

According to the invention as set forth in claim 16, in the invention as set forth in claim 12, the optical signal monitoring apparatus further has an optical modulator, and the method further has (f) a step of measuring an intensity deviation between each adjacent pair of bits due to a shift of a center bias of the optical modulator, and (g) a step of controlling the center bias of the optical modulator so that the intensity deviation measured in the step (f) becomes zero.

DETAILED DESCRIPTION OF THE PREFERRED EMBODIMENTS

A first embodiment of the present invention will be described.

Figure 1:
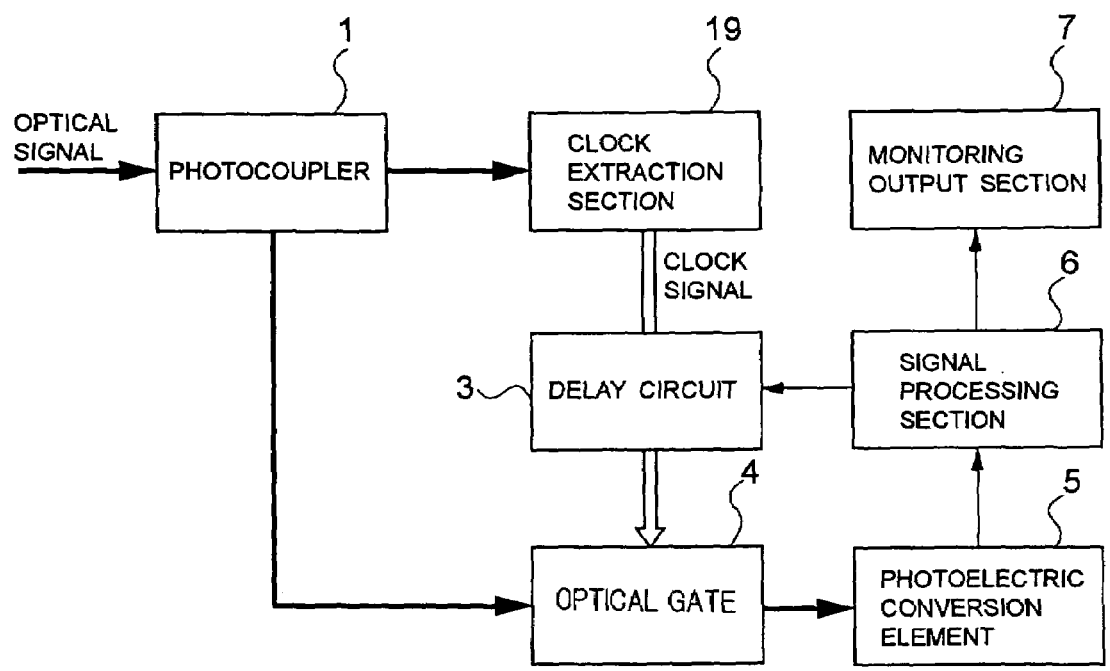
FIG. 1 is a block diagram of an optical signal monitoring apparatus in a first embodiment of the present invention.
Figure 2:
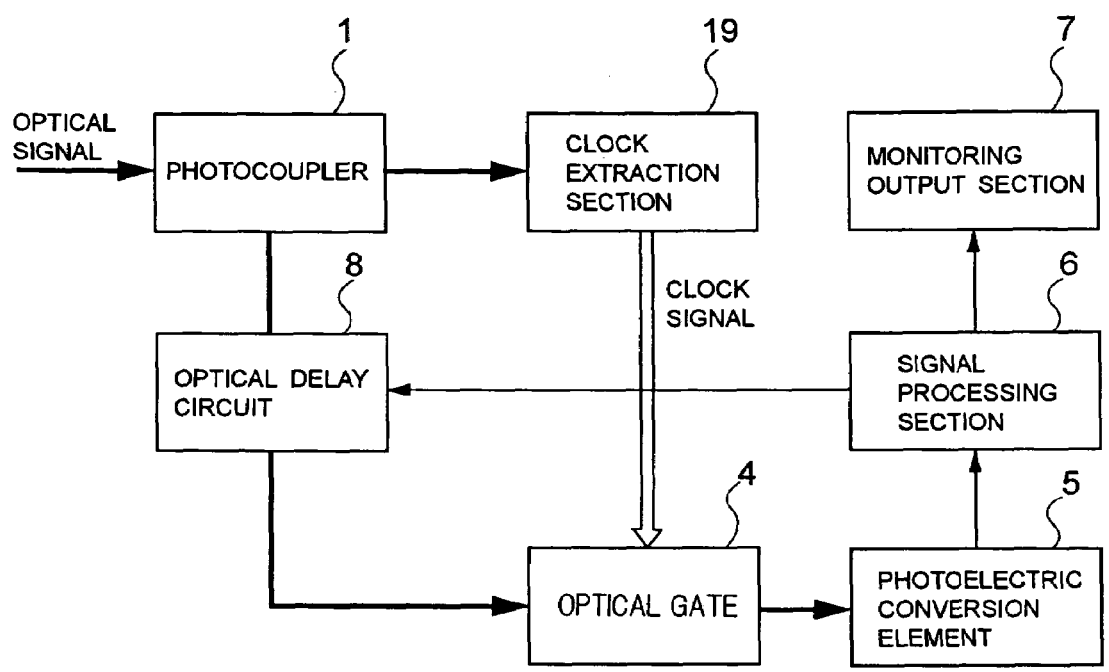
FIG. 2 is a block diagram showing a change in the configuration of the delay circuit in the optical signal monitoring apparatus in the first embodiment.
Figure 3:
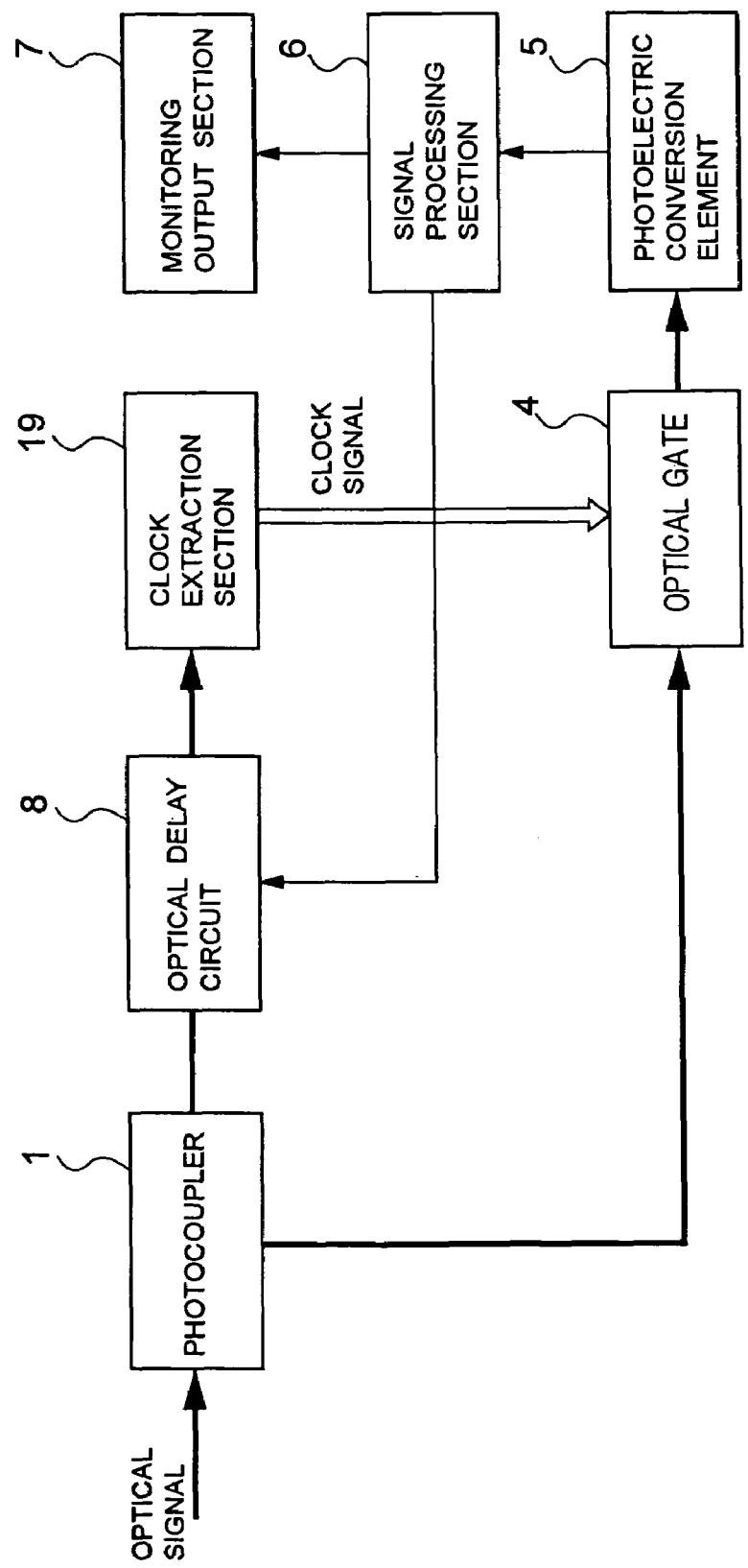
FIG. 3 is a block diagram showing a change in the configuration of the delay circuit in the optical signal monitoring apparatus in the first embodiment.
Figure 4:
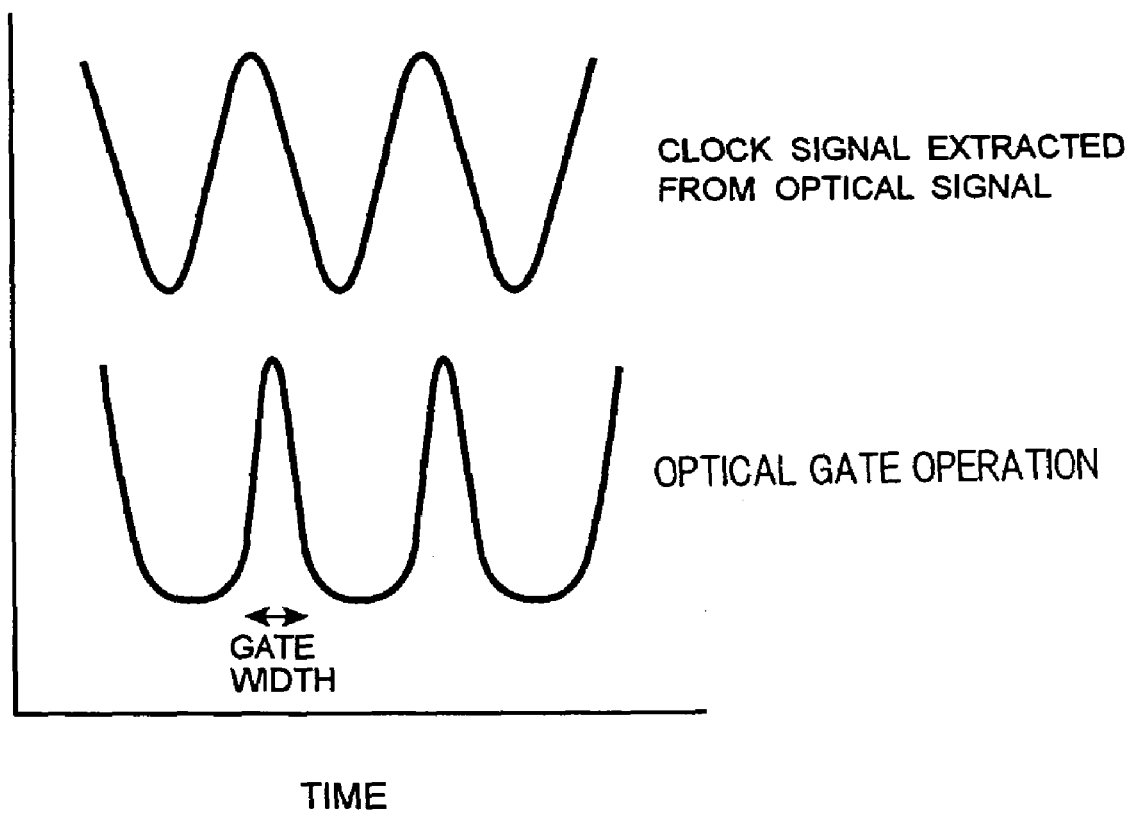
FIG. 4 is a diagram showing a clock signal extracted from an optical signal and the operation of the optical gate in a state where timing of opening/closing of the optical gate is controlled.
Figure 5A:
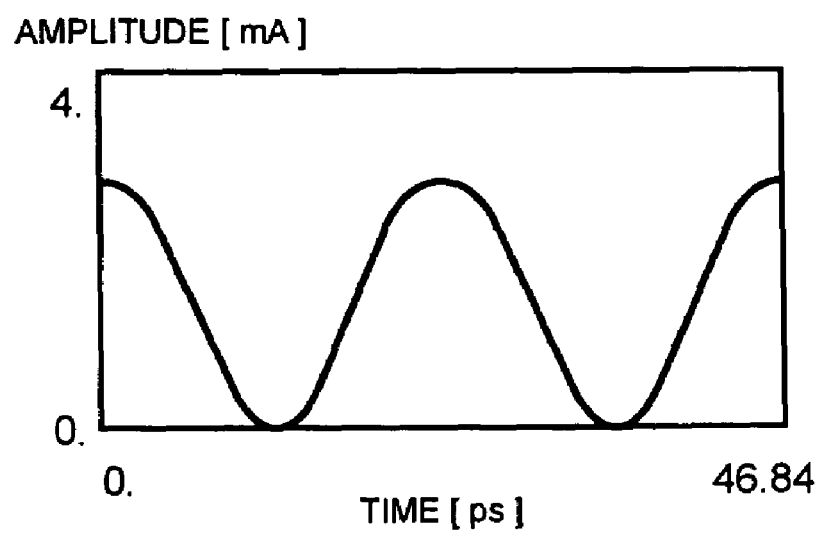
FIGS. 5A and 5B are diagrams showing the waveform of an input optical signal and an optical signal monitoring output obtained from the input optical signal.
Figure 5B:
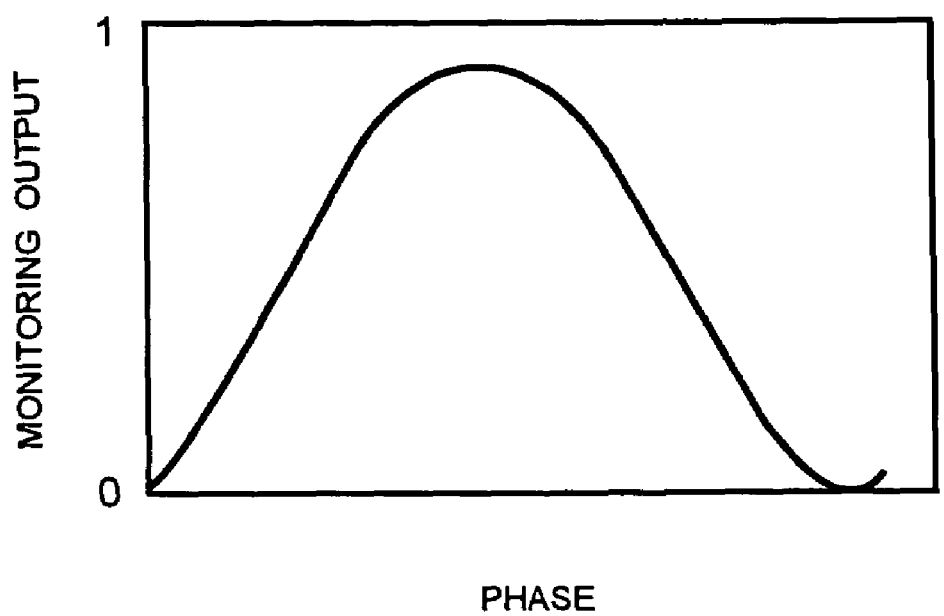
Figure 6A:
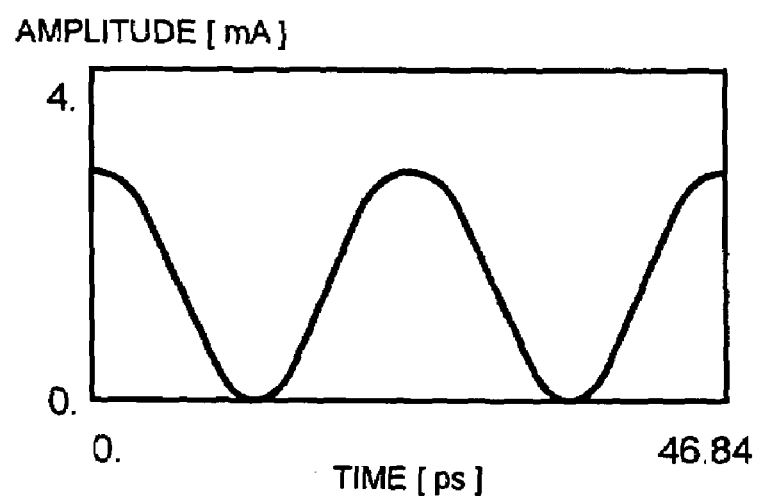
FIGS. 6A and 6B are diagrams showing the eye waveform of an optical signal and the optical signal monitoring output waveform from the optical signal monitoring apparatus with respect to a 42.7 Gbits/s CS-RZ modulation format when chromatic dispersion was 0 ps/nm.
Figure 6B:
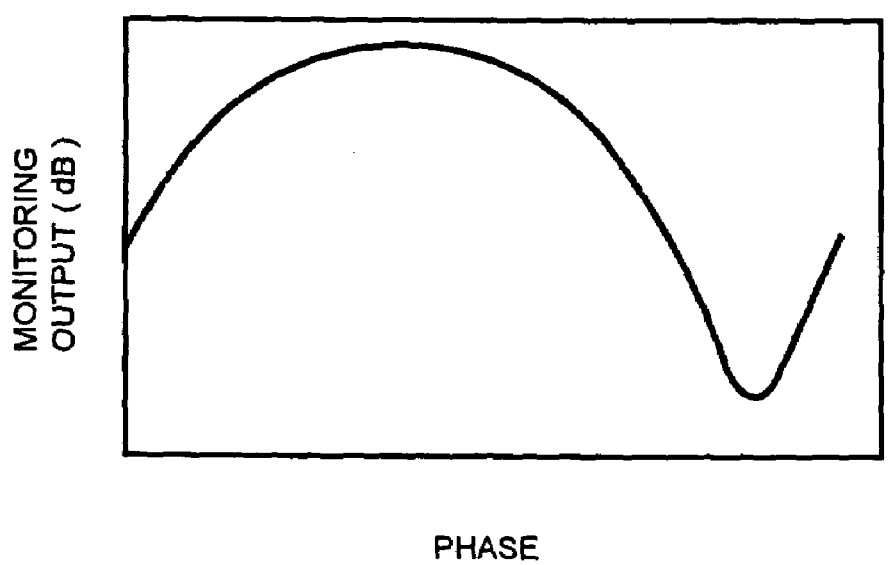
Figure 7A:
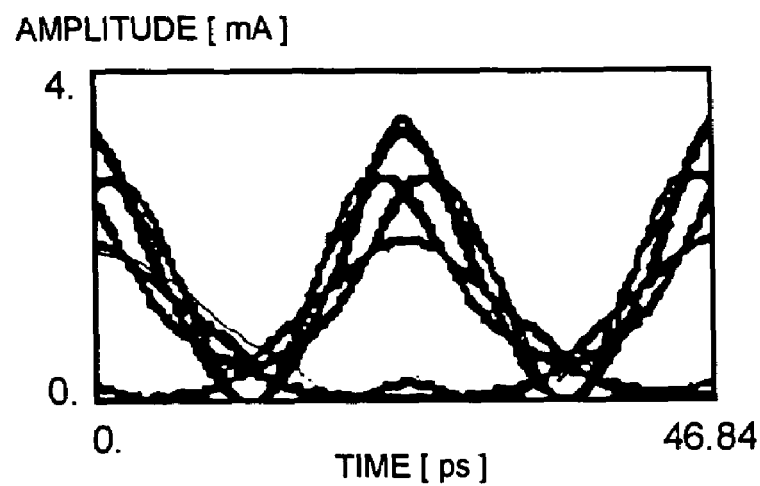
FIGS. 7A and 7B are diagrams showing the eye waveform of the optical signal and the optical signal monitoring output waveform from the optical signal monitoring apparatus with respect to the 42.7 Gbits/s CS-RZ modulation format when chromatic dispersion was −40 ps/nm.
Figure 7B:
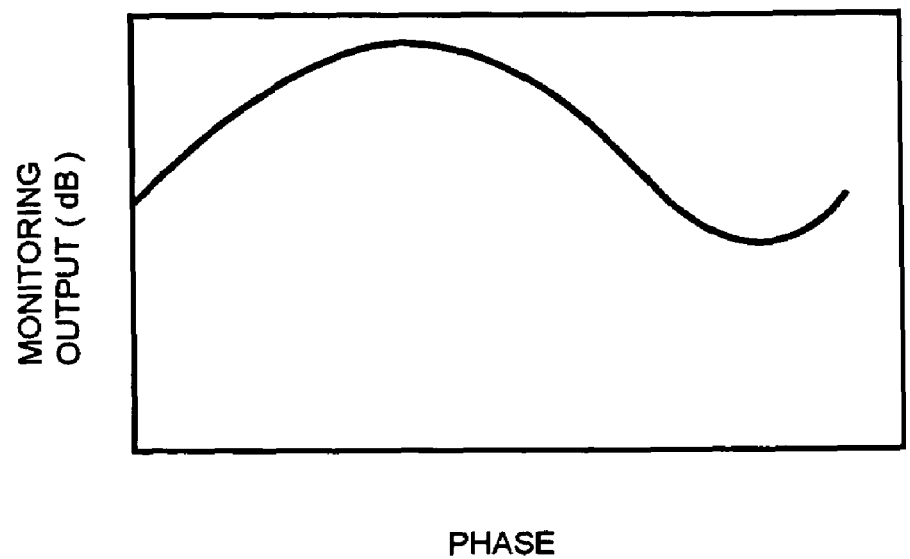
Figure 8:
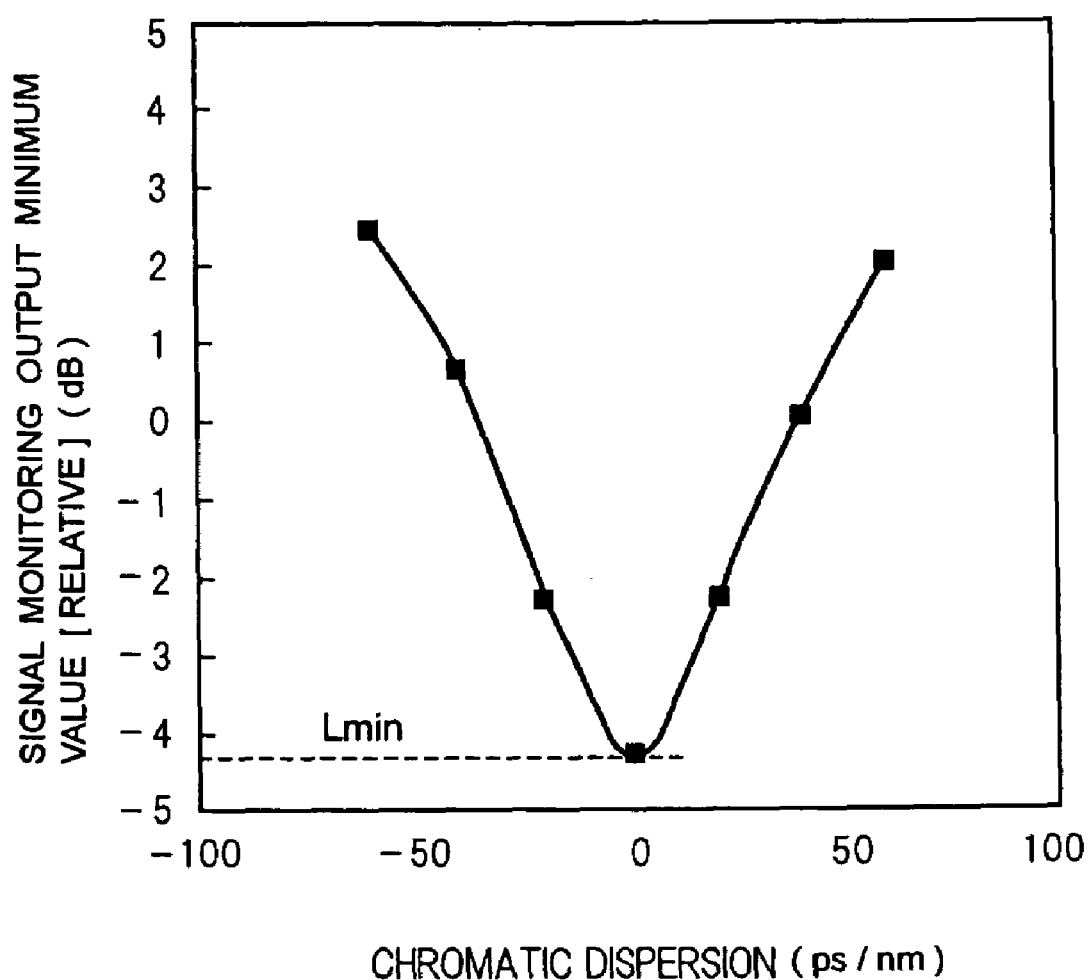
FIG. 8 is a diagram showing the relationship between chromatic dispersion and the minimum value of the optical signal monitoring output waveform from the optical signal monitoring apparatus with respect to the 42.7 Gbits/s CS-RZ modulation format.
Figure 9A:
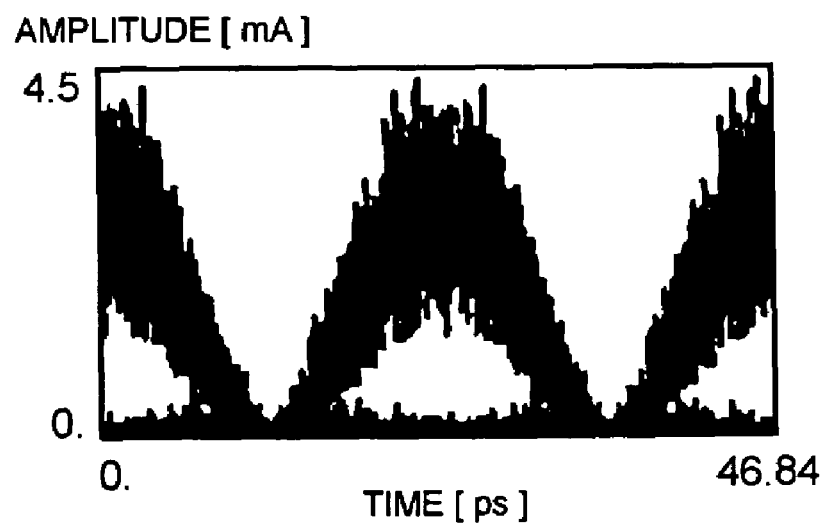
FIGS. 9A and 9B are diagrams showing the eye waveform of an optical signal and the optical signal monitoring output waveform from the optical signal monitoring apparatus with respect to a 42.7 Gbits/s CS-RZ modulation format when chromatic dispersion was 0 ps/nm, and when noise was added.
Figure 9B:
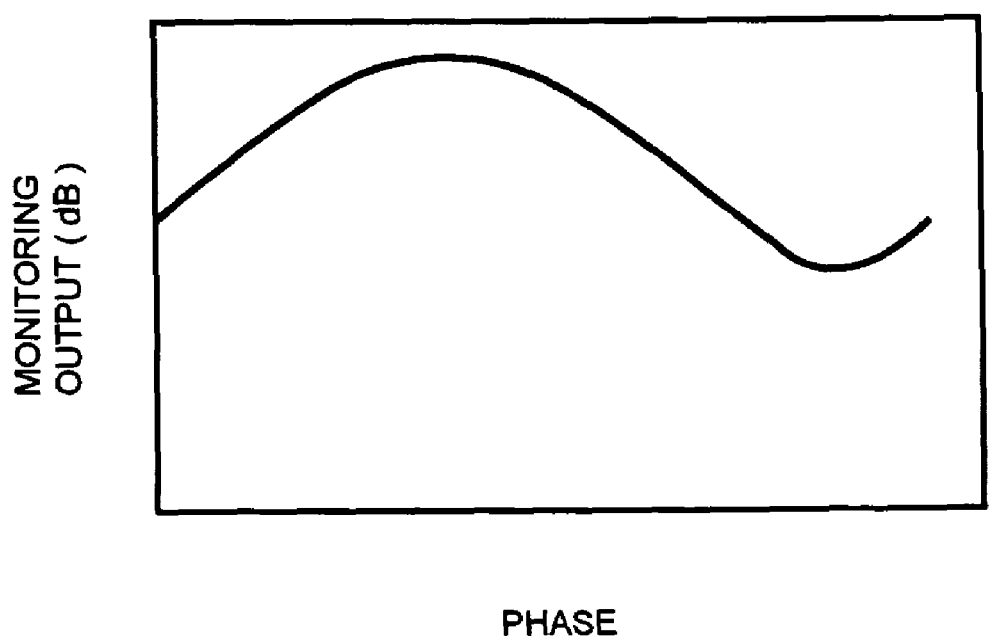
Figure 10A:
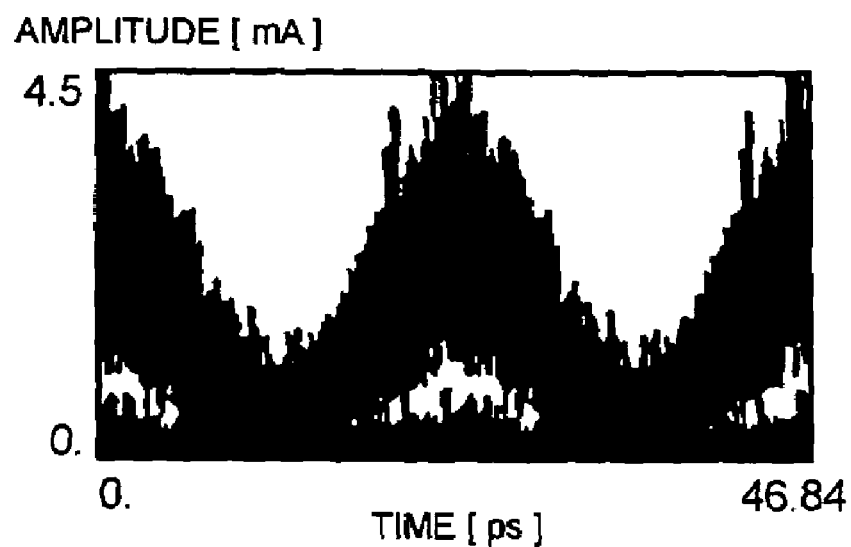
FIGS. 10A and 10B are diagrams showing the eye waveform of the optical signal and the optical signal monitoring output waveform from the optical signal monitoring apparatus with respect to the 42.7 Gbits/s CS-RZ modulation format when chromatic dispersion was −40 ps/nm, and when noise was added.
Figure 10B:
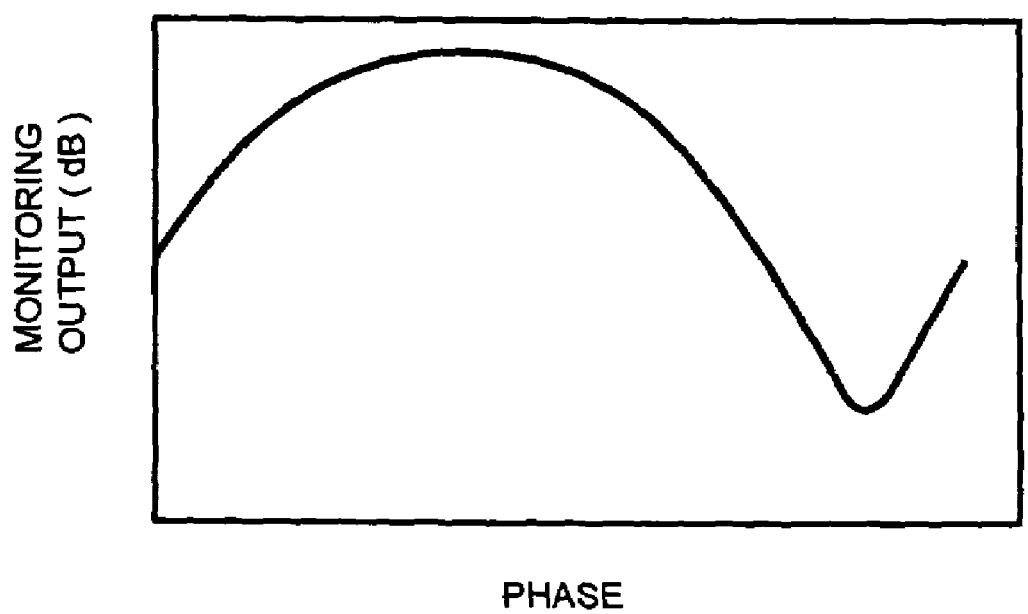

FIG. 1 is a block diagram of an optical signal monitoring apparatus in the first embodiment of the present invention. FIGS. 2 and 3 are diagrams each showing a change in the configuration of the delay circuit in the optical signal monitoring apparatus in the first embodiment. FIG. 4 is a diagram-showing a clock signal extracted from an optical signal and the operation of the optical gate in a state where timing of opening/closing of the optical gate is controlled by the clock signal. FIGS. 5A and 5B are diagrams showing the waveform of an input optical signal and an optical signal monitoring output obtained from the input optical signal. FIGS. 6A and 6B are diagrams showing the eye waveform of an optical signal and the optical signal monitoring output waveform from the optical signal monitoring apparatus with respect to a 42.7 Gbits/s CS-RZ modulation format when chromatic dispersion was 0 ps/nm. FIGS. 7A and 7B are diagrams showing the eye waveform of the optical signal and the optical signal monitoring output waveform from the optical signal monitoring apparatus with respect to the 42.7 Gbits/s CS-RZ modulation format when chromatic dispersion was −40 ps/nm. FIG. 8 is a diagram showing the relationship between chromatic dispersion and the minimum value of the optical signal monitoring output waveform from the optical signal monitoring apparatus with respect to the 42.7 Gbits/s CS-RZ modulation format. FIGS. 9A and 9B are diagrams showing the eye waveform of an optical signal and the optical signal monitoring output waveform from the optical signal monitoring apparatus with respect to a 42.7 Gbits/s CS-RZ modulation format when waveform dispersion was 0 ps/nm, and when noise was added. FIGS. 10A and 10B are diagrams showing the eye waveform of the optical signal and the optical signal monitoring output waveform from the optical signal monitoring apparatus with respect to the 42.7 Gbits/s CS-RZ modulation format when waveform dispersion was −40 ps/nm, and when noise was added.

Figure 20A:
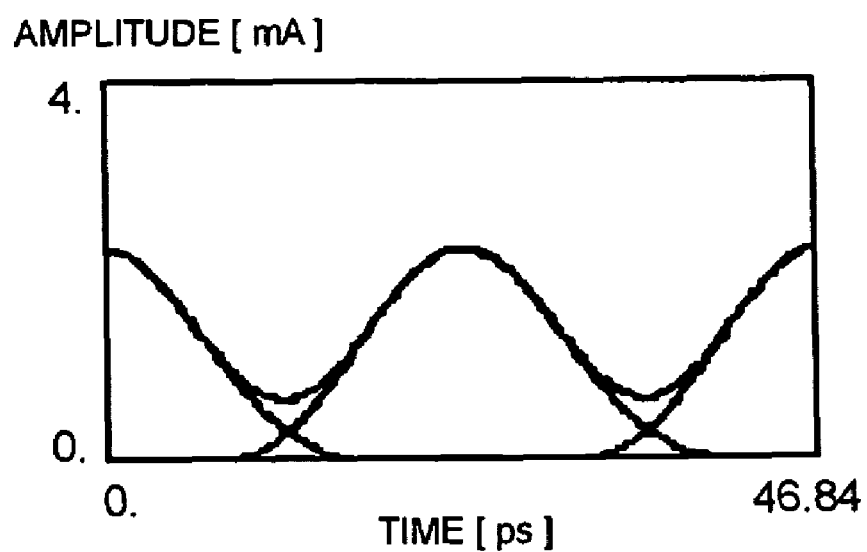
FIGS. 20A and 20B are diagrams showing the eye waveform of an optical signal and the optical signal monitoring output waveform from the optical signal monitoring apparatus with respect to the 42.7 Gbits/s CS-RZ modulation format when waveform dispersion was 0 ps/nm in a case where optical signal waveform frequency band limitation was performed.
Figure 20B:
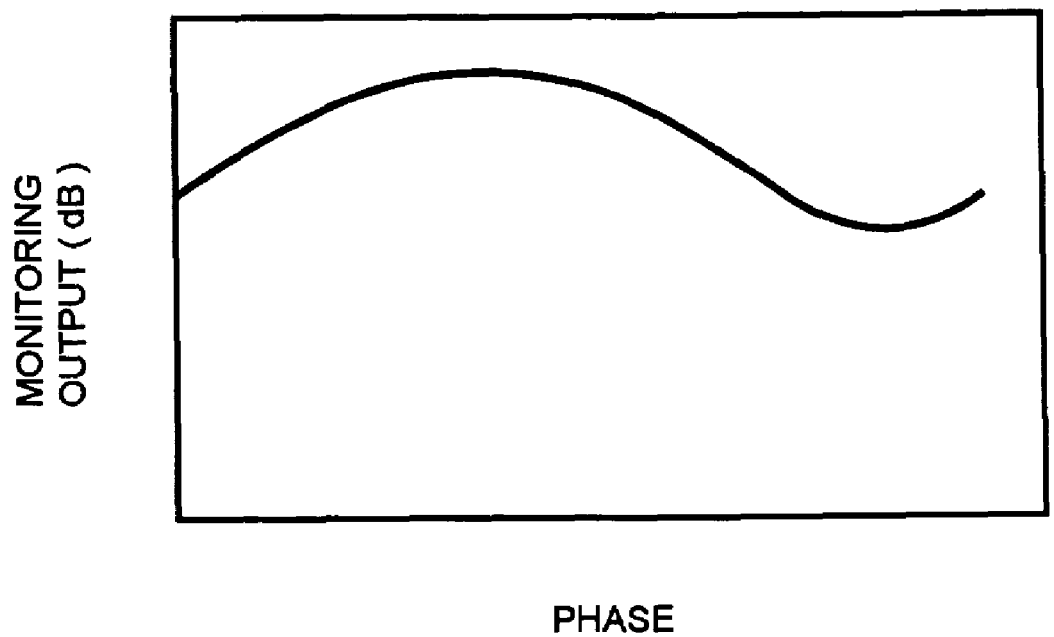
Figure 21A:
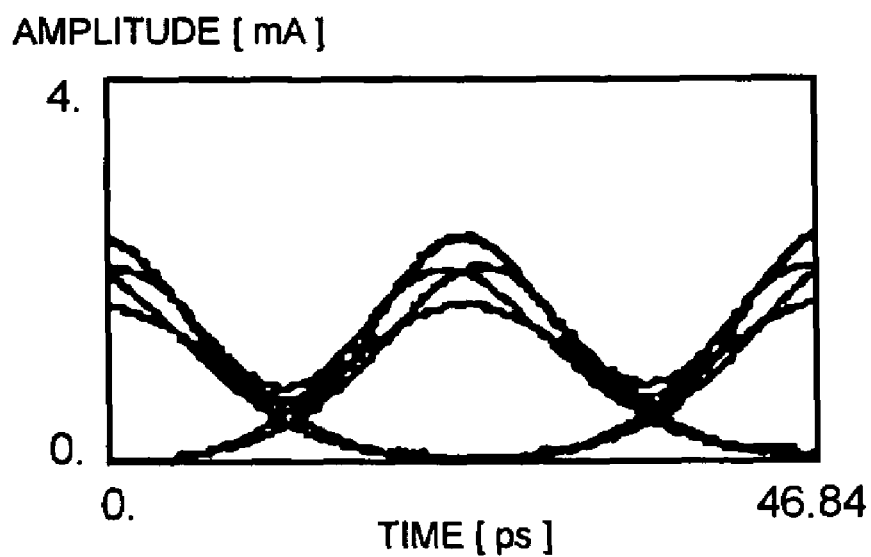
FIGS. 21A and 21B are diagrams showing the eye waveform of the optical signal and the optical signal monitoring output waveform from the optical signal monitoring apparatus with respect to the 42.7 Gbits/s CS-RZ modulation format when waveform dispersion was −40 ps/nm in the case where optical signal waveform frequency band limitation was performed.
Figure 21B:
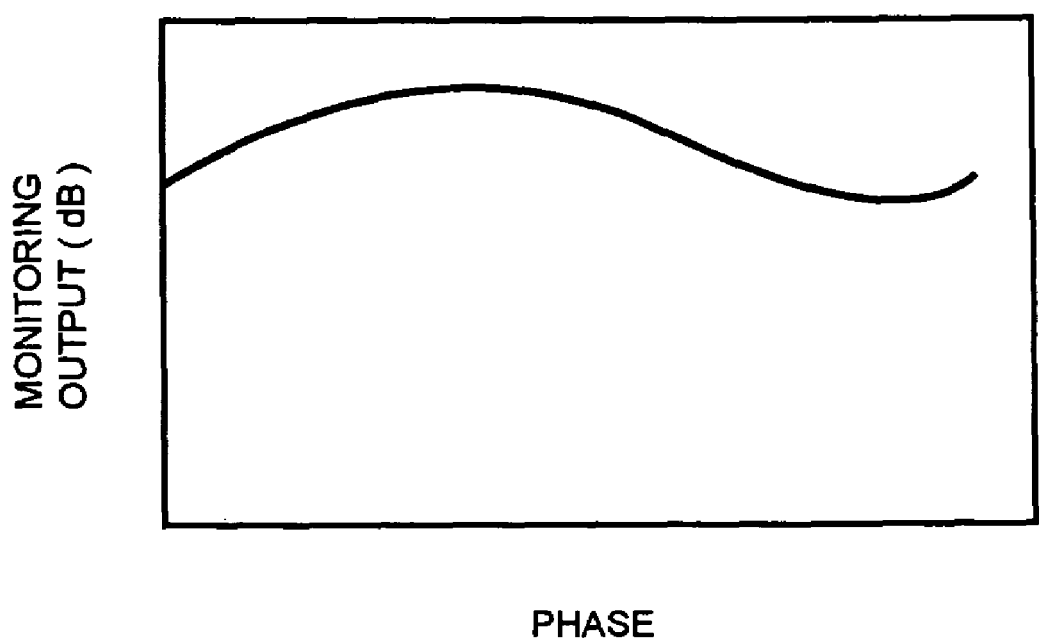

FIGS. 20A and 20B show the eye waveform of an optical signal and the optical signal monitoring output waveform from the optical signal monitoring apparatus with respect to the 42.7 Gbits/s CS-RZ modulation format when waveform dispersion was 0 ps/nm in a case where optical signal waveform frequency band limitation was performed. FIGS. 21A and 21B show the eye waveform of the optical signal and the optical signal monitoring output waveform from the optical signal monitoring apparatus with respect to the 42.7 Gbits/s CS-RZ modulation format when waveform dispersion was −40 ps/nm in the case where optical signal waveform frequency band limitation was performed.

Referring to FIG. 1, an optical signal monitoring apparatus has a photocoupler 1, a clock extraction section 19 which extracts a clock signal synchronized with an optical signal from the photocoupler 1, a optical gate 4 which is controlled in opening/closing timing by means of the extracted clock, a delay circuit 3 which controls the phase of the clock signal for control of opening/closing of the optical gate 4, a photoelectric conversion element 5 which detects the intensity of the optical signal passed through the optical gate 4, a signal processing section 6 which relates the intensity of light detected by the photoelectric conversion element 5 and the set phase of the clock signal to each other, and a monitoring output section 7 which displays monitoring data obtained by the signal processing section 6.

The photocoupler 1 outputs a supplied optical signal to the clock extraction section 19 and to the optical gate 4.

The delay circuit 3 adjusts (changes by a phase in the range from 0 to 360°) the phase difference between the optical signal input from the photocoupler 1 to the optical gate 4 and the clock signal from the clock extraction section 19. This delay circuit 3 is provided in a clock line between the clock extraction section 19 and the optical gate 4. This embodiment will be described below with respect to a case where the delay circuit 3 is provided in the clock line between the clock extraction section 19 and the optical gate 4, but the arrangement may alternatively be such that, for example, as shown in FIG. 2, an optical delay circuit 8 is placed as the delay circuit 3 before the optical gate 4. The optical delay circuit 8 changes the delay time according to an instruction from the signal processing section 6. The delay time is the amount of delay of the optical signal from the time at which the optical signal traveling from the photocoupler 1 in the case where the optical delay circuit 8 is not provided reaches the optical gate 4. For instance, if the rate of transmission of the optical signal is 40 Gbits/s, the optical delay circuit 8 changes the delay time by an amount of 0 ps to 25 ps according to an instruction from the signal processing section 6.

The arrangement may alternatively be such that the optical delay circuit 8 is placed as the delay circuit 3 before the clock extraction circuit 19 as shown in FIG. 3.

The waveform condition of the optical signal is measured by adjusting the phase difference or the delay time as described above.

The optical gate 4 controls transmission/non-transmission of the optical signal from the photocoupler 1 (turning on/off of the signal). Timing of turning on/off is controlled by means of the clock signal extracted by the clock extraction section 19, i.e., the clock signal synchronized with the optical signal from the photocoupler 1. For instance, in a case where a device such as an electro-absorption (EA) type of semiconductor modulator nonlinear in response to an input signal is used as the optical gate 4, the optical gate 4, as shown in FIG. 4, is synchronized with the optical signal by the sine wave clock signal from the clock extraction section 19 to perform an optical gate operation of such a duty ratio that the on-state width (hereinafter referred to as "gate width") is 0.5 or smaller. That is, the optical signal is input to the photoelectric conversion element 5 for a limited time period determined by the gate width in the one bit slot.

The photoelectric conversion element 5 is used to obtain an average light intensity of the signal passed through the optical gate 4 (e.g., a device having a sufficiently low response frequency relative to the bit rate of the optical signal). The average intensity distribution in one bit slot in the optical signal waveform, i.e., the envelop of the optical signal waveform, can be extracted by changing at the delay circuit 3 the phase difference between the optical signal and the control clock signal to the optical gate.

In this monitoring apparatus, high-rate sampling for every bit slot is performed by using the clock signal synchronized with the optical signal. The photoelectric conversion element 5, therefore, can average a larger amount of totalized data in a short time. That is, a measured value can be obtained with stability in a short time and, therefore, the measurement time can be reduced and evaluation improved in realtimeness can be achieved.

The signal processing section 6 transmits to the delay circuit 3 a phase value indicating to which extent the phase should be changed, and outputs to the monitoring output section 7 information on the average light intensity received from the photoelectric conversion element 5 with respect to the phase value transmitted to the delay circuit 3. For instance, in a case where an optical signal in a return-to-zero (RZ) format having a bit rate of 42.7 Gbits/s is input and where the gate width of the optical gate 4 is 10% of the bit slot, the monitoring output section 7 displays a plot of data corresponding to one bit is displayed as a monitoring output, as shown in FIGS. 5A and 5B. As can be understood from this monitoring output from the monitoring output section 7, the envelop of the input optical signal is extracted with fidelity. While this embodiment is described with respect to a case where the delay circuit 3 is provided between the clock extraction section 19 and the optical gate 4, a notice provided as an instruction to convert the delay time is sent to the optical delay circuit 8 in a case where the optical delay circuit 8 is provided instead of the delay circuit 3.

The process of monitoring an optical signal with the above-described optical signal monitoring apparatus will now be described.

The photocoupler 1 inputs an optical signal to be observed to the optical gate 4.

Timing of opening/closing of the optical gate 4 is controlled by means of the clock signal synchronized with the optical signal from the optical gate 4, i.e., the clock signal having a period equal to the bit interval of data or N (N: a positive integer) times longer than the bit interval. The optical gate 4 thereby allows each pulse of the optical signal for one bit of data to pass therethrough for only part of the time width of the gate. The optical signal that has passed through the optical gate 4 is input to the photoelectric conversion element 5.

The photoelectric conversion element 5, to which portions of the optical signal passed through the optical gate 4 for only part of the time width are input, obtains an average light intensity of the input optical signal. At this time, the phase difference between the optical signal and the clock signal for control of the optical gate 4 is changed by the delay circuit 3 to the intensity distribution in one bit of the optical signal waveform, i.e., the envelop of the optical signal waveform, to be extracted. Applications of the present invention to automatic control of a dispersion compensator, automatic adjustment of a discrimination threshold level in an optical receiver, etc., made possible in such a manner that the compression or expansion of bit pulses obtained from the envelop of the optical signal waveform or deterioration in SN ratio is related to the influence of chromatic dispersion or polarization mode dispersion.

The signal processing section 6 outputs information on the average light intensity obtained by the photoelectric conversion element 5 to the monitoring output section 7.

It is also possible to obtain information on the waveform of adjacent N bits by controlling timing of opening/closing of the optical gate 4 by means of the clock signal having a period N (N: a positive integer) times longer than the bit slot of data.

The results of monitoring of waveform degradation due to chromatic dispersion obtained by using the above-described optical signal monitoring apparatus will be described.

An optical signal can be affected by chromatic dispersion so that the pulse waveform forming one bit is expanded (or compressed). FIGS. 6A, 6B, 7A, and 7B show an example of such a change in waveform observed with the optical signal monitoring apparatus. The results of observation shown in these figures were obtained by using an optical signal formed at a modulation rate of 42.7 Gbits/s in a carrier-suppressed RZ (CS-RZ) modulation format and by setting an α-parameter to +0.7. FIGS. 6A and 6B show the waveforms when chromatic dispersion was 0 ps/nm, and FIGS. 7A and 7B show the waveforms when waveform dispersion was −40 ps/nm. The width of the optical gate was set to a large value, 25% of the bit slot. From these figures, it can be understood that the minimum value of the monitoring output at the bit boundary position varies largely in relation to the existence/nonexistence of dispersion.

FIG. 8 shows a plot of the minimum value of the optical signal monitoring output waveform with respect to chromatic dispersion. The influence of chromatic dispersion can be measured from changes in the monitoring signal. Further detailed measurements can be made, for example, by using the pulse width or amplitude of the monitoring output waveform. Even if the gate width is set to a large value as in the case of the above-described measurement, satisfactory chromatic dispersion measurements can be made.

The results of testing of the waveform monitoring operation in a case where noise exists in the input waveform will be described.

FIGS. 9A and 9B show the input signal waveform and the optical signal monitoring output when waveform dispersion was 0 ps/nm, and FIGS. 10A and 10B show the input signal waveform and the optical signal monitoring output when waveform dispersion was −40 ps/nm. It can be understood that even when noise is added as shown in the figures, the optical signal monitoring output changes with respect to input waveforms under different dispersions as in the case shown in FIGS. 6A, 6B, 7A, and 7B. That is, waveform degradation due to chromatic dispersion can be monitored.

The example which the CS-RZ modulation format is used for the optical signal is described above, the other modulation formats, such as the RZ or the NRZ modulation-formats are applicable for detecting the variation of the waveform dispersion.

The sensitivity of detection of waveform degradation and the optical gate width according to the present invention will be described.

In this optical signal monitoring apparatus, the envelop of the optical waveform can be reproduced with fidelity if the gate width of the optical gate 4 can be reduced to 5% of the bit slot for example.

In the current technology, however, a special optical gate is required to reproduce the envelop of the optical waveform with fidelity, resulting in a high-cost arrangement.

In the optical signal monitoring apparatus of the present invention, as described above, an EA modulator may be used to ensure that a change in waveform due to dispersion can be detected with high sensitivity by using an optical gate which has such a gate width (25%) relative to the bit slot as to be formed comparatively easily. This is because time region limitation only by the optical gate is effected on the optical signal not limited to the frequency band of any photoelectric conversion device or an electric amplifier.

FIGS. 20A, 20B, 21A, and 21B show the results of computation in the case of effecting frequency band limitation to 80% of the bit rate of the optical signal with respect to the same transmitted optical signal conditions as those of the signal shown in FIGS. 6A, 6B, 7A, and 7B, as well as the output results obtained by monitoring the optical signal with the optical signal monitoring apparatus of the present invention when the frequency-band-limited signal was input to the monitoring apparatus. FIGS. 20A and 20B show the results of simulation when chromatic dispersion was 0 ps/nm, while FIGS. 21A and 21B show the results of simulation when chromatic dispersion was −40 ps/nm. The width of the optical gate was set to 25% of the bit slot.

From the comparison with FIGS. 6A, 6B, 7A, and 7B, it can be understood that a large waveform change difference occurred between the case where optical signal frequency band limitation was performed and the case where no optical signal frequency band limitation was performed, and that it is difficult to detect a change in waveform if band limitation is performed.

In the optical signal monitoring apparatus of the present invention, a change in waveform can be captured with high sensitivity, as shown in FIGS. 6A, 6B, 7A, and 7B, since waveform information is extracted from the waveform not band-limited.

For example, in a sampling oscilloscope, an optical signal is converted into an electrical signal and the electrical signal is amplified. Then, a change in waveform is degraded and waveform information has to be extracted from the waveform shown in FIGS. 20A, 20B, 21A and 21B in a case. On the contrary, in a latest-type sampling oscilloscope, a high-priced device is required in the process of converting a high-rate optical signal, for example, of 40 Gbits/s or higher into an electrical signal and amplifying the electrical signal in order to reproduce the optical signal with as high fidelity as possible. According to the present invention, the state of waveform degradation can be extracted with high sensitivity even though such a device is not used.

A second embodiment of the present invention will be described.

The second embodiment of the present invention is characterized in that an optical receiver is used in place of the clock extraction section.

Figure 11:
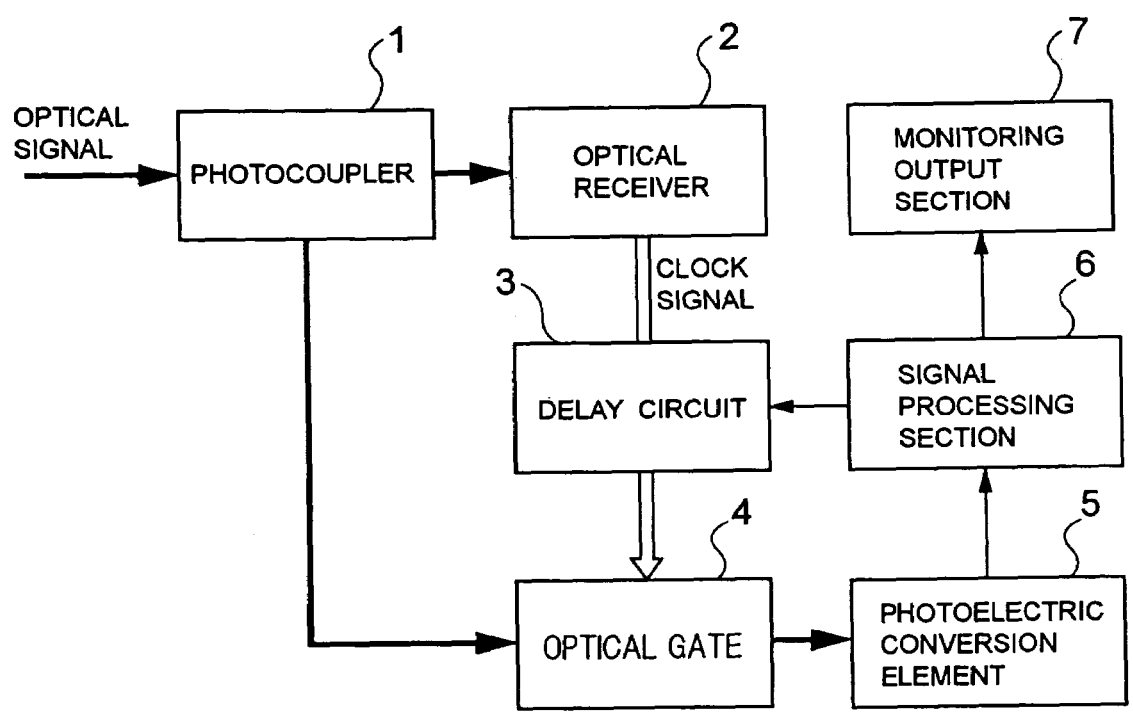
FIG. 11 is a block diagram of an optical signal monitoring apparatus in a second embodiment of the present invention.
Figure 12:
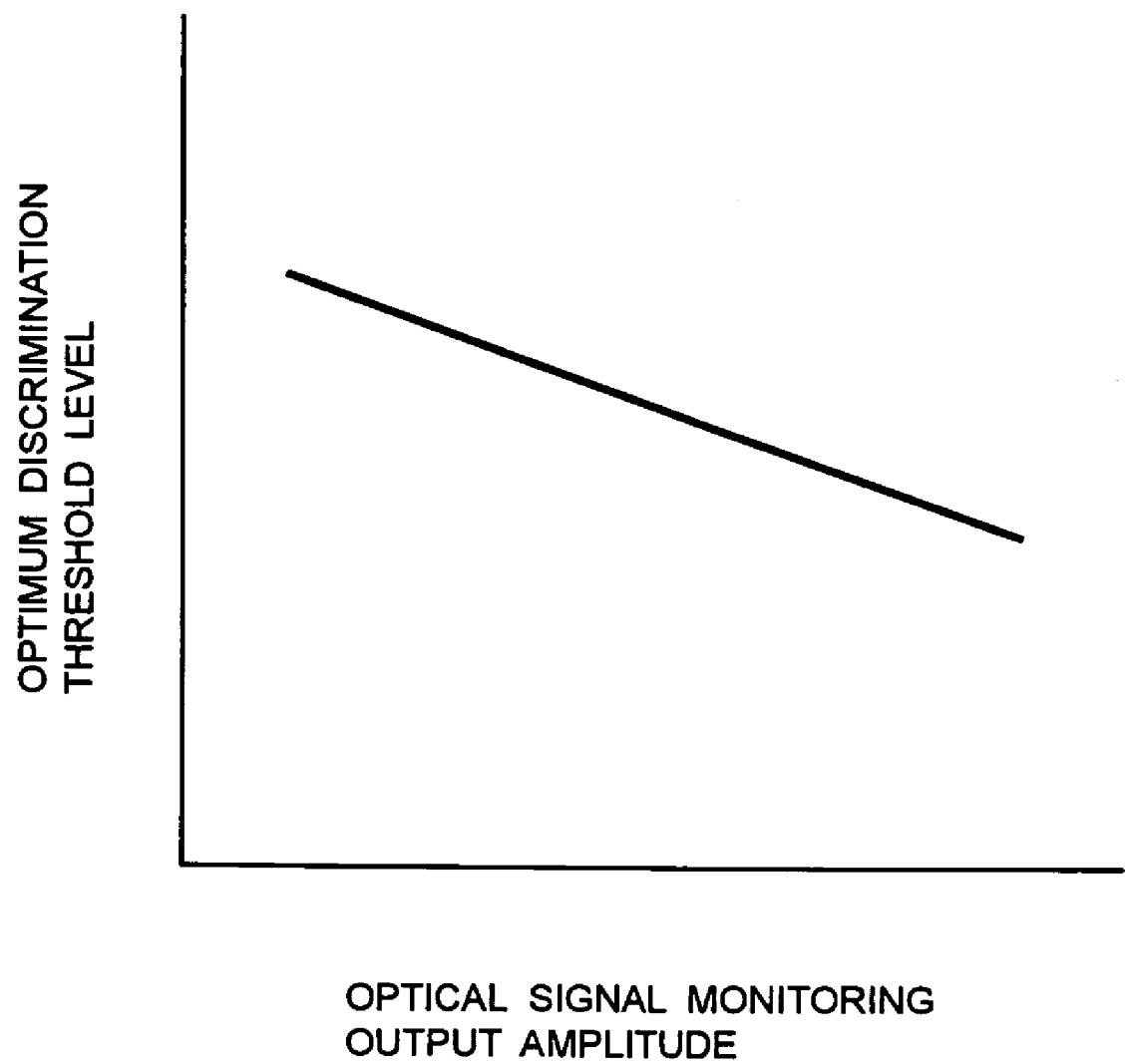
FIG. 12 is a diagram showing the relationship between the optical signal output amplitude and the optimum discrimination threshold level in the optical signal monitoring apparatus.

FIG. 11 is a block diagram of an optical signal monitoring apparatus in the second embodiment. FIG. 12 is a diagram showing the relationship between the optical signal output amplitude and the optimum discrimination threshold level in the optical signal monitoring apparatus.

The configuration of the second embodiment differs from that of the first embodiment in that an optical receiver 2 is used in place of the clock extraction section 19 of the first embodiment and the clock extraction function of the optical receiver 2 is used.

The optical receiver 2 extracts the clock signal by using its clock extraction function and supplies the extracted clock signal to the optical gate 4.

Thus, the clock signal is extracted by the optical receiver 2 and is supplied to the optical gate 4. The optical gate 4 controls timing of opening/closing of the gate on the basis of the clock signal supplied from the optical receiver 2.

As a result, the need for a special clock extraction section for optical signal monitoring is eliminated. Also, a discrimination point in the optical receiver 2 can be controlled by using the optical signal monitoring output. For example, changes in waveform due to chromatic dispersion can be completely compensated for to enable determination as to whether or not the optimum discrimination threshold level is changed even in a case where the amplitude of the optical signal monitoring output is changed.

Further, the relationship between the output amplitude and the optimum discrimination threshold level may be obtained as shown in FIG. 12 to enable automatic adjustment of the discrimination level according to the output amplitude, whereby the reduction in Q-value is minimized.

A third embodiment of the present invention will be described.

The third embodiment of the present invention is characterized in that a variable dispersion compensator which compensates for chromatic dispersion of an optical signal is controlled on the basis of the optical signal monitoring output.

Figure 13:
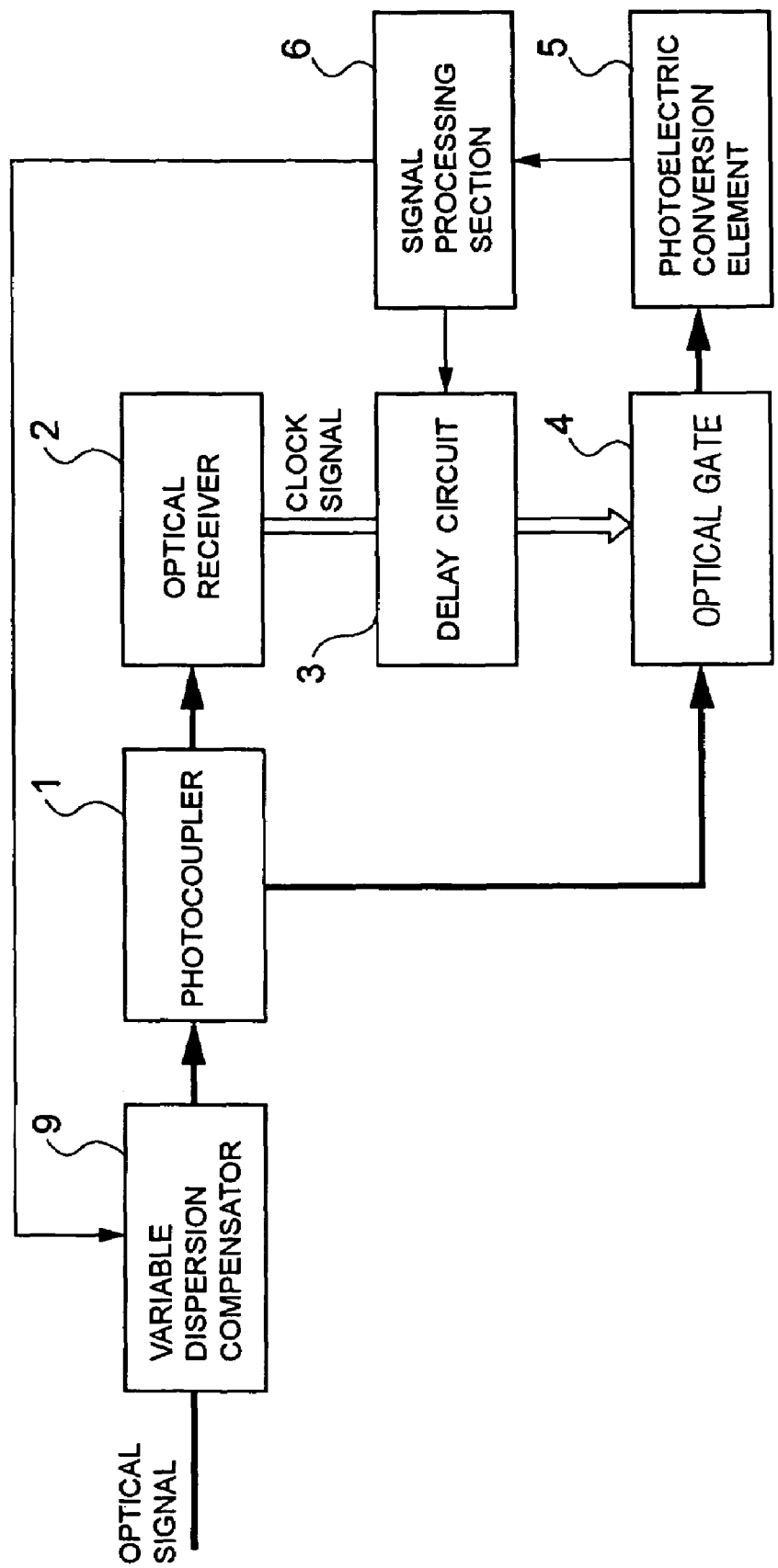
FIG. 13 is a block diagram of an optical signal monitoring apparatus in a third embodiment of the present invention.

FIG. 13 is a block diagram of an optical signal monitoring apparatus in the third embodiment.

The configuration of the third embodiment differs from that of the second embodiment in that a variable dispersion compensator 9 is placed before the photocoupler 1.

The signal processing section 6 can quantatively detect waveform degradation due to chromatic dispersion from the optical signal monitoring output, as described above in the description of the first embodiment. The signal processing section 6 controls the variable dispersion compensator 9 on the basis of the result of this detection, thereby compensating for waveform degradation of the optical signal input to the optical receiver 2 to minimize the waveform degradation of the optical signal in comparison with the state before optical signal compensation. In this manner, the reduction in Q-value can be limited. For example, in the case of the above-described CS-RZ modulation format, the minimum value of the optical signal monitoring output varies with respect to chromatic dispersion in the transmission path, as shown in FIG. 8. Therefore, the variable dispersion compensator 9 may be controlled so as to always output the smallest value indicated by Lmin. Thus, the optical signal from which the influence of chromatic dispersion has been removed can be input to the optical receiver 2.

Monitoring and control of chromatic dispersion in the case of the NRZ modulation format will be described.

Figure 14:
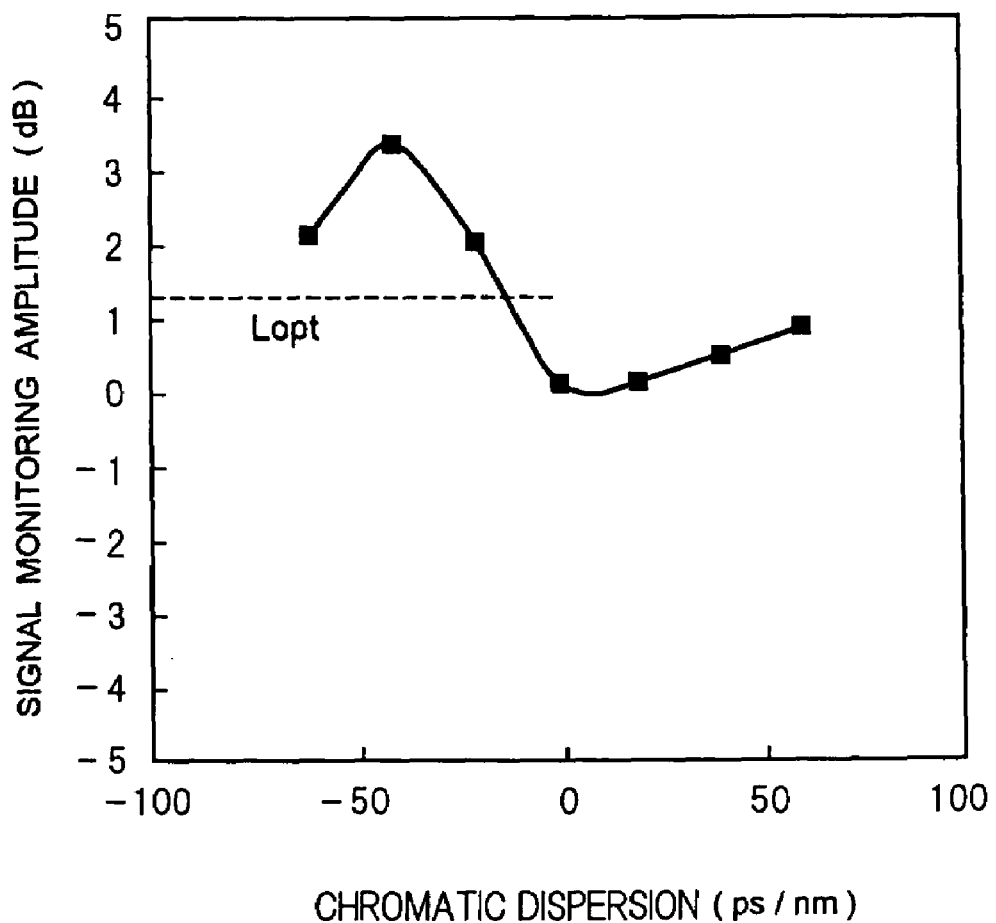
FIG. 14 is a diagram showing the relationship between chromatic dispersion and the amplitude of the optical signal output waveform from the optical signal monitoring apparatus with respect to a 42.7 Gbits/s nonreturn-to-zero (NRZ) modulation format.
Figure 15A:
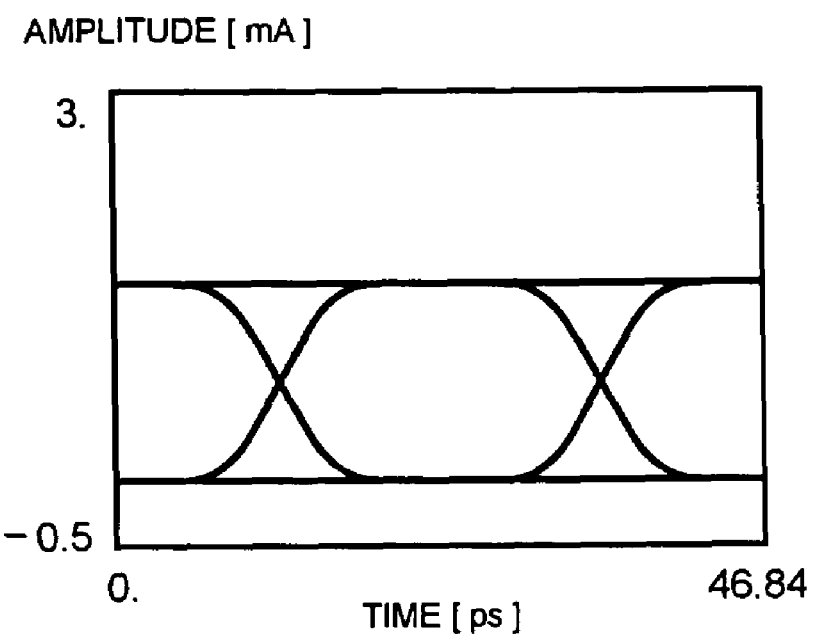
FIGS. 15A and 15B are diagrams showing the eye waveform of an optical signal and the optical signal monitoring output waveform from the optical signal monitoring apparatus with respect to the 42.7 Gbits/s NRZ modulation format when chromatic dispersion was 0 ps/nm.
Figure 15B:
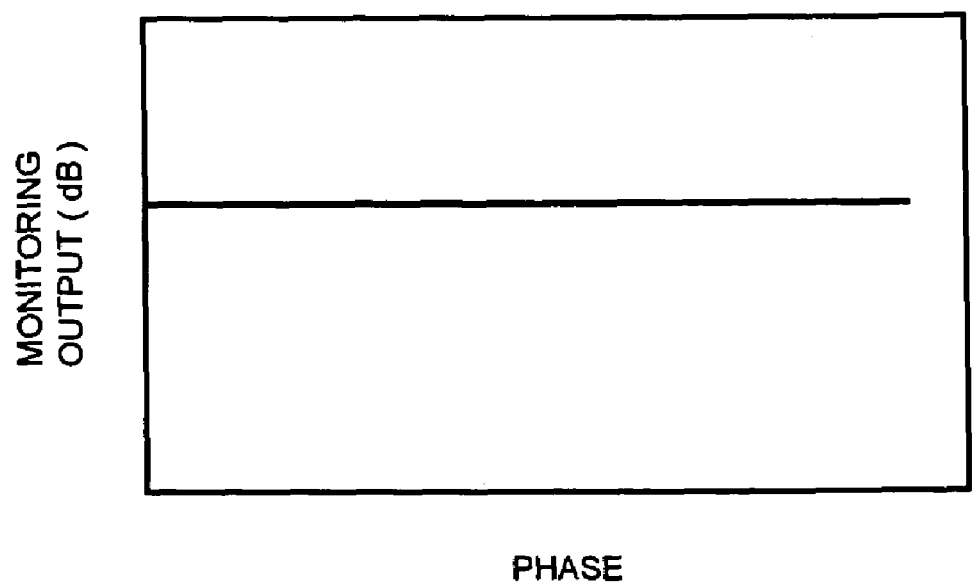
Figure 16A:
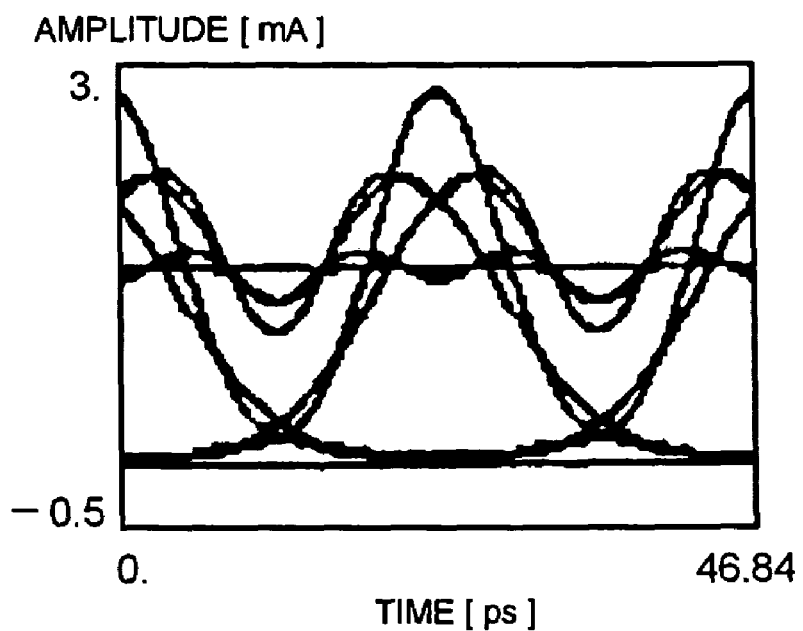
FIGS. 16A and 16B are diagrams showing the eye waveform of the optical signal and the optical signal monitoring output waveform from the optical signal monitoring apparatus with respect to the 42.7 Gbits/s NRZ modulation format when chromatic dispersion was −40 ps/nm.
Figure 16B:
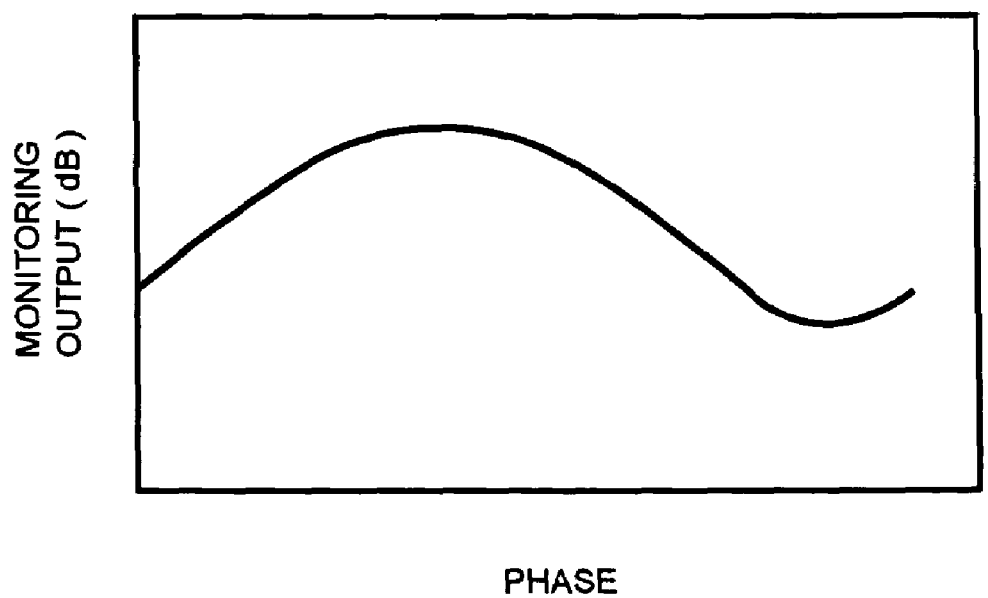

FIG. 14 is a diagram showing the relationship between chromatic dispersion and the amplitude of the optical signal output waveform from the optical signal monitoring apparatus with respect to a 42.7 Gbits/s nonreturn-to-zero (NRZ) modulation format. FIGS. 15A and 15B show the eye waveform of an optical signal and the optical signal monitoring output waveform from the optical signal monitoring apparatus with respect to the 42.7 Gbits/s NRZ modulation format when waveform dispersion was 0 ps/nm. FIGS. 16A and 16B show the eye waveform of the optical signal and the optical signal monitoring output waveform from the optical signal monitoring apparatus with respect to the 42.7 Gbits/s NRZ modulation format when waveform dispersion was −40 ps/nm.

FIGS. 14, 15A and 15B show the monitoring output waveform in the case when the modulation speed is 42.7 Gbits/s and when the waveform dispersion in the transmission path is changed. FIG. 14 shows the result when the modulation speed is 42.7 G bits/s and FIGS. 15A and 15B show the results when the waveform dispersion is −40 ps/nm. The width of the optical gate was 25% of the bit slot and the α-parameter of a LiNbO3 (LN) modulator for NRZ modulation was +0.7.

In the NRZ modulation format, when dispersion is 0 ps/nm, the average light level is constant with respect to all time regions divided by the optical gate 4, and the optical signal monitoring apparatus of the present invention has a constant output with respect to the delay time and is therefore incapable of obtaining information other than the light intensity.

However, when the value of dispersion in the fiber is changed, the pulse waveform of bits is compressed with respect to a certain direction of change, as is that in the case of RZ modulation format. Thus, the optical signal monitoring output can be obtained as an amplitude output not constant along the phase axis but changing according to the change in waveform. It is also known that, in actuality, in the case of the NRZ modulation format, the Q-value is highest when the dispersion value is about −20 ps/nm, that is, when pulses are slightly compressed.

In control of chromatic dispersion, therefore, stabilization is effected about a position Lopt (see FIGS. 15A and 15B) at which the change in monitoring output amplitude is large with respect to the dispersion value.

A fourth embodiment of the present invention will be described.

The fourth embodiment is characterized in that a polarization mode dispersion compensator is controlled from waveform information obtained by optical signal monitoring.

Figure 17:
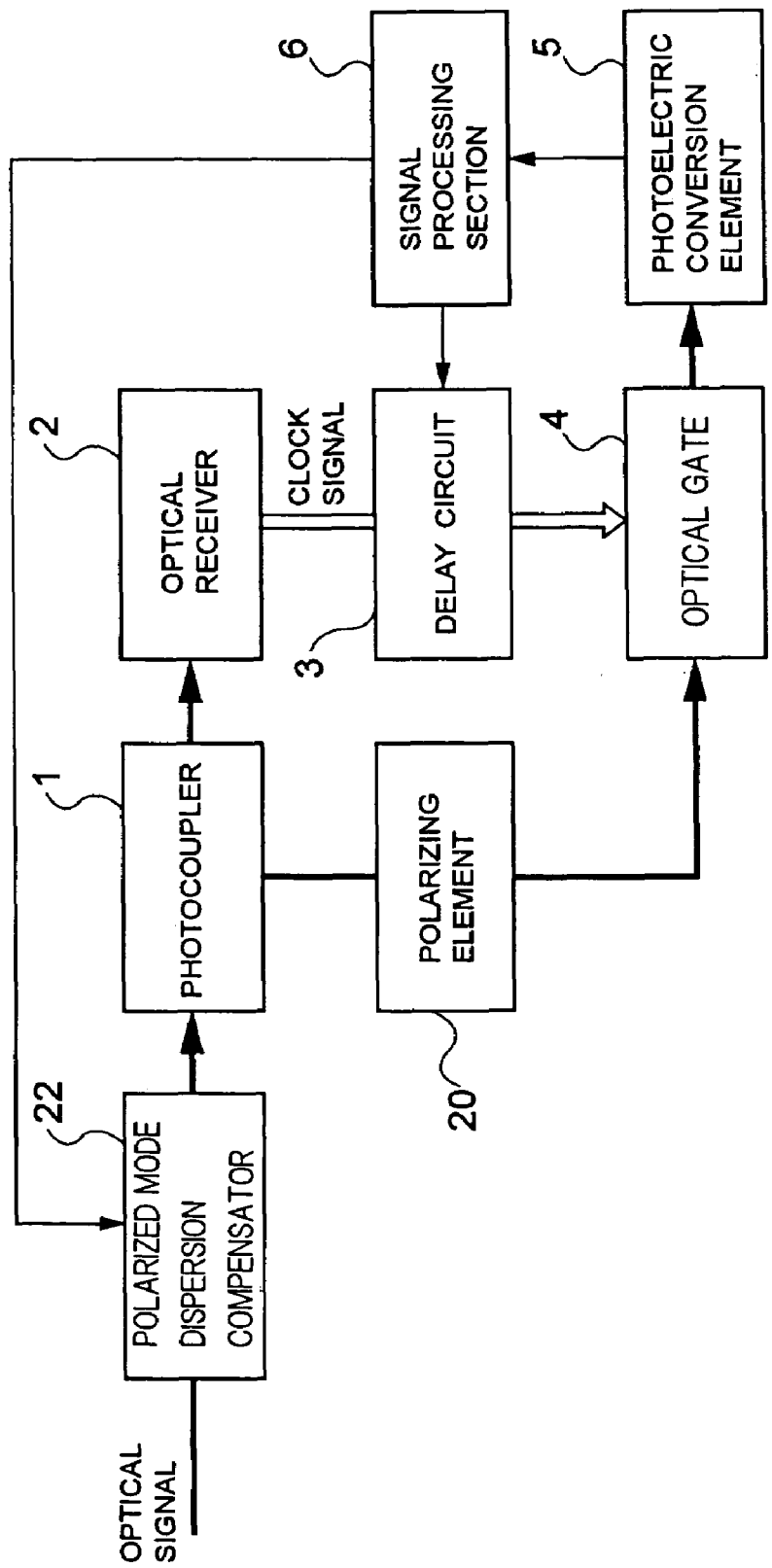
FIG. 17 is a block diagram of an optical signal monitoring apparatus in a fourth embodiment of the present invention.
Figure 18:
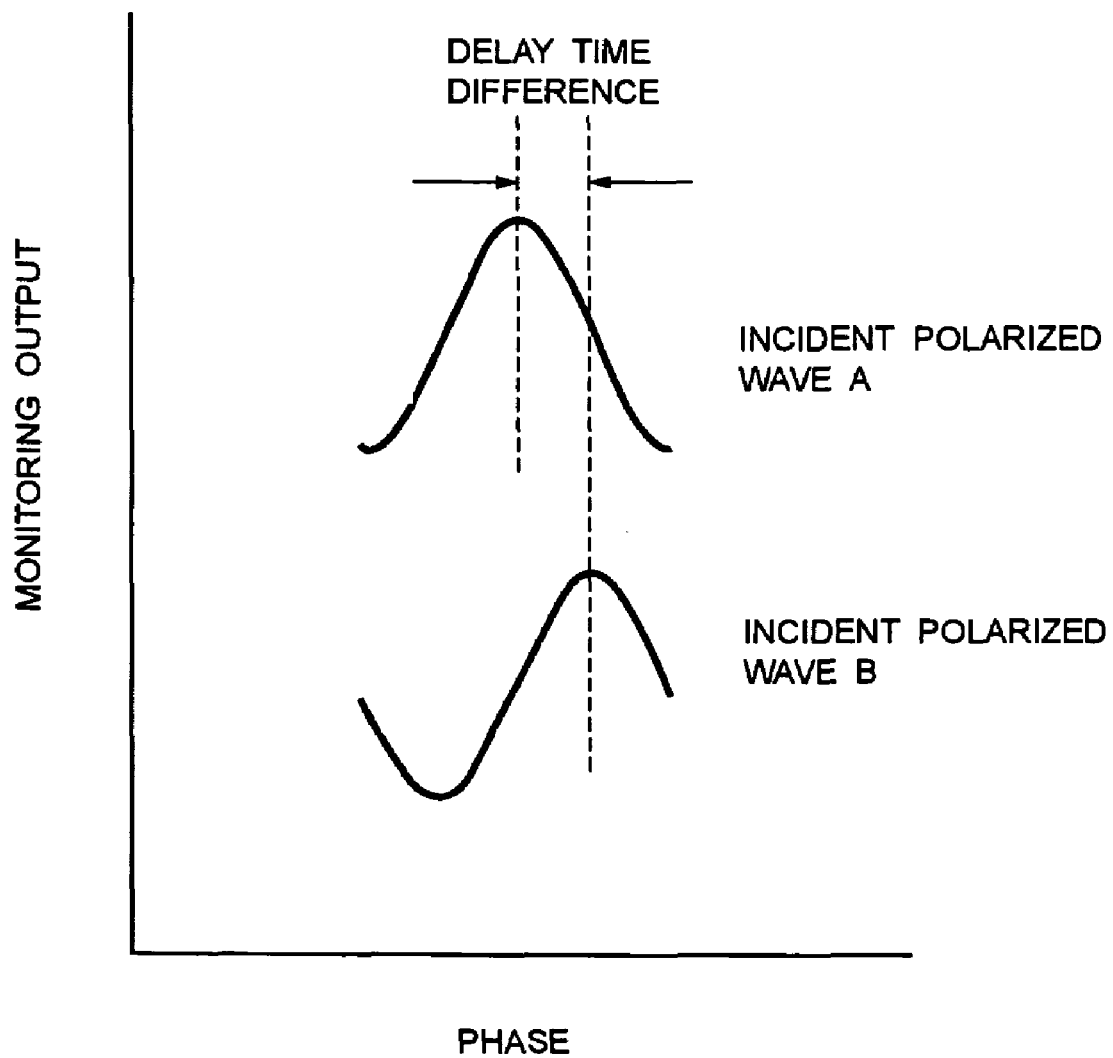
FIG. 18 is a diagram for explaining a polarization direction dependence of the optical signal waveform in optical signal monitoring.
Figure 19:
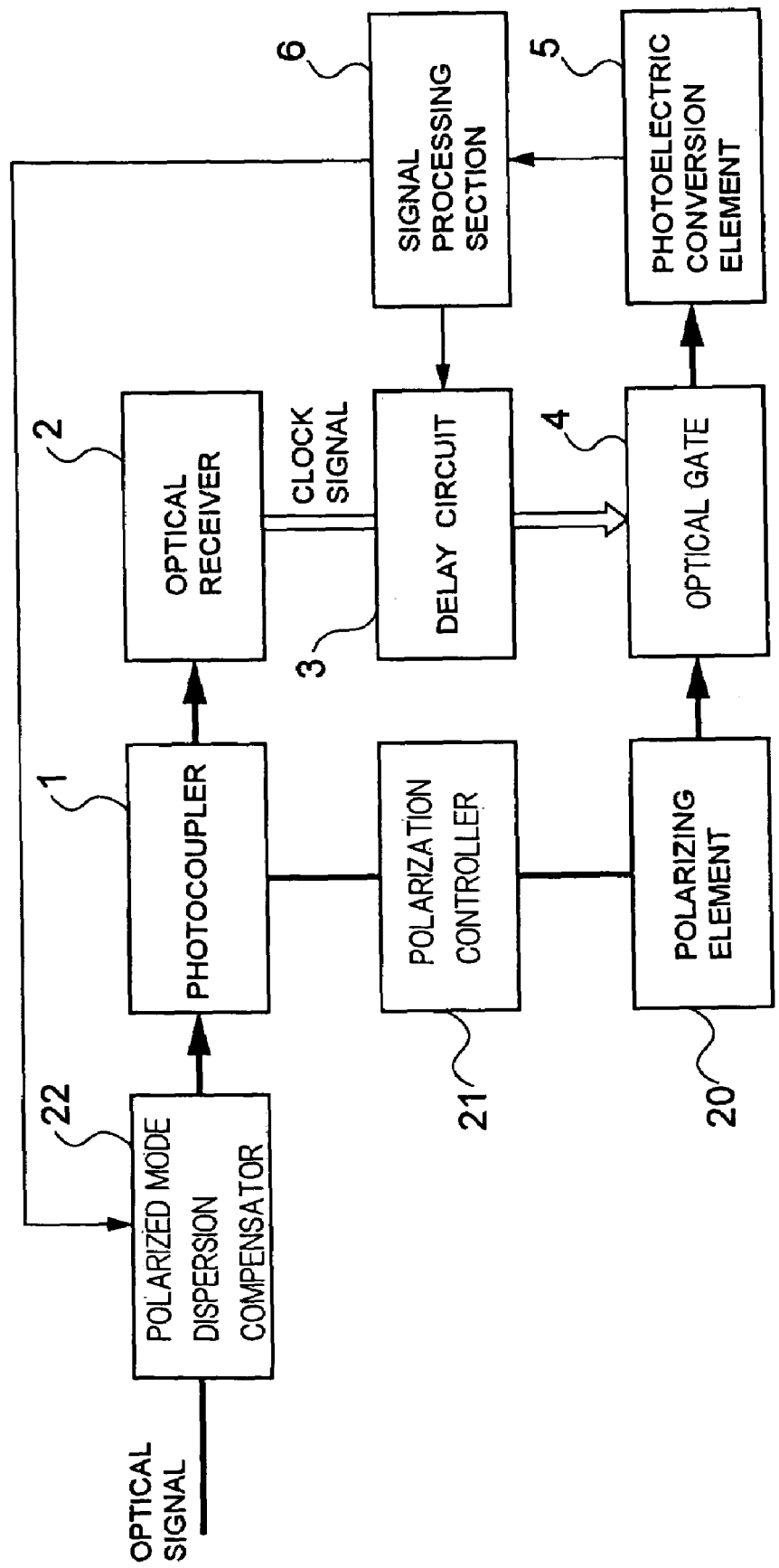
FIG. 19 is a block diagram showing addition of a polarization controller to the optical signal monitoring apparatus in the fourth embodiment.

FIG. 17 is a block diagram of an optical signal monitoring apparatus in the fourth embodiment. FIG. 18 is a diagram for explaining a polarization direction dependence of the optical signal waveform in optical signal monitoring. FIG. 19 is a block diagram showing addition of a polarization controller to the optical signal monitoring apparatus in the fourth embodiment.

A method of controlling the polarization mode dispersion compensator from waveform information obtained by optical signal monitoring will be described.

Also in a case where polarization mode dispersion exists in the transmission path, the optical signal waveform is also degraded, as is that under the influence of waveform dispersion.

Waveform degradation of the optical signal can be detected from a change in the optical signal monitoring output, as described above. The polarization mode dispersion compensator is controlled by using the result of this detection so that waveform degradation of the optical signal after compensation for waveform degradation is minimized (the degree of waveform degradation is reduced to substantially zero) in comparison with the state before the compensation. In this manner, the reduction in Q-value can be minimized.

As a method of improving the accuracy with which waveform degradation due to polarization mode dispersion, a method may be used in which, as shown in FIG. 17, a polarizing element 20 is placed immediately before the optical gate 4 and the direction of polarization of an optical signal is limited by the polarizing element 20 before the optical signal is input to the optical gate 4.

In the polarizing element 20, the direction of polarization of the optical signal is changed between two or more directions to obtain the optical signal monitoring output in each state. A polarization direction dependence of the optical signal waveform is thereby obtained to enable estimation of the value of polarization mode dispersion. For example, in a case where the optical signal monitoring outputs with respect to the two polarization components orthogonal to each other are as indicated by A and B in FIG. 18, the delay time difference is obtained from the phase difference between the two waveforms. The polarization mode dispersion compensator 22 can be controlled on the basis of this delay time difference.

A combination of a polarization controller 21 for controlling the direction of polarization of the optical signal and the polarizing element 20 for inputting the optical signal to the optical gate 4 while limiting the direction of polarization of the optical signal may be provided as shown in FIG. 19. In this case, waveform evaluation is performed while the direction of polarization of the optical signal input from the photocoupler 1 is changed by the polarization controller. Thus, determination of a polarization direction dependence of the optical waveform is made, as is that described above, thereby enabling control of the polarization mode dispersion compensator.

Advantageously, the influences of polarization mode dispersion and chromatic dispersion can be detected separately from each other if a polarization dependence of the optical waveform is measured as described above. That is, a chromatic dispersion compensator and a polarization mode dispersion compensator are connected in series and the compensators can be controlled independently of each other by using the optical signal monitoring output.

A fifth embodiment of the present invention will be described.

The fifth embodiment is characterized in that control of a modulator in a CS-RZ (Carrier Suppressed RZ) modulation format is performed by using an optical signal monitor.

Figure 22:
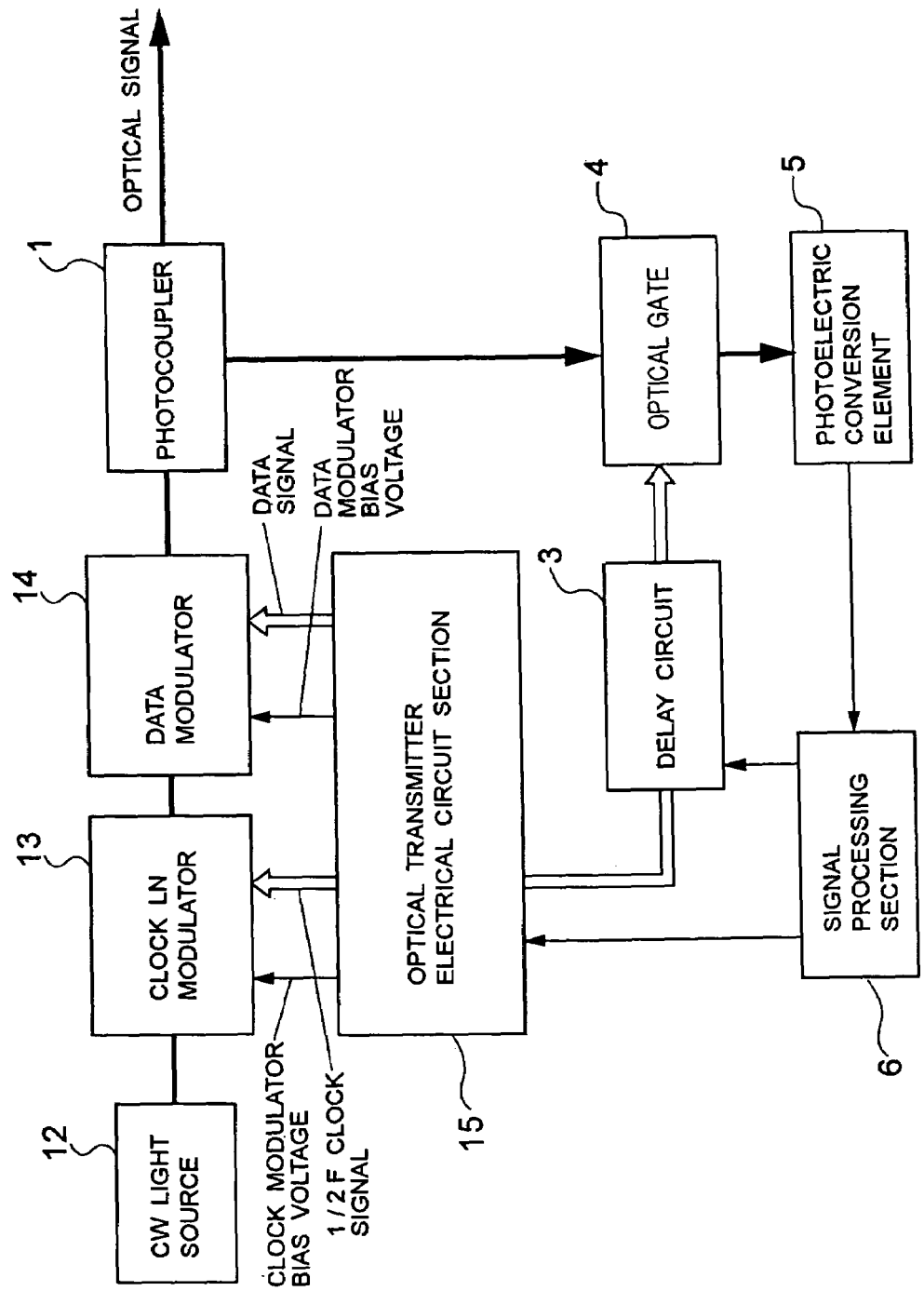
FIG. 22 is a block diagram of an optical signal monitoring apparatus in a fifth embodiment of the present invention.
Figure 23A:
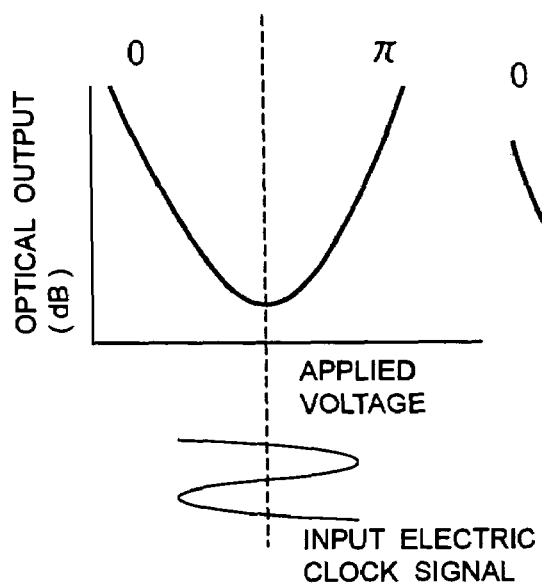
FIGS. 23A and 23B are diagrams for explaining a method of generating a clock signal in the CS-RZ modulation format.
Figure 23B:
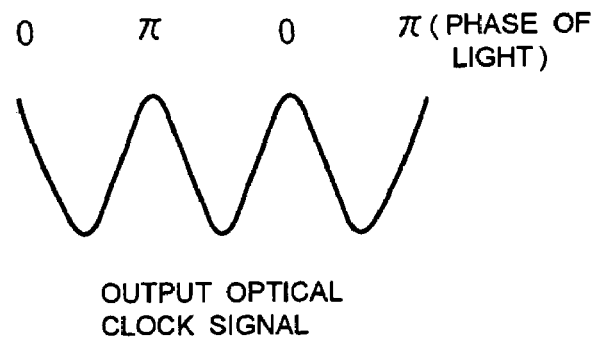
Figure 24A:
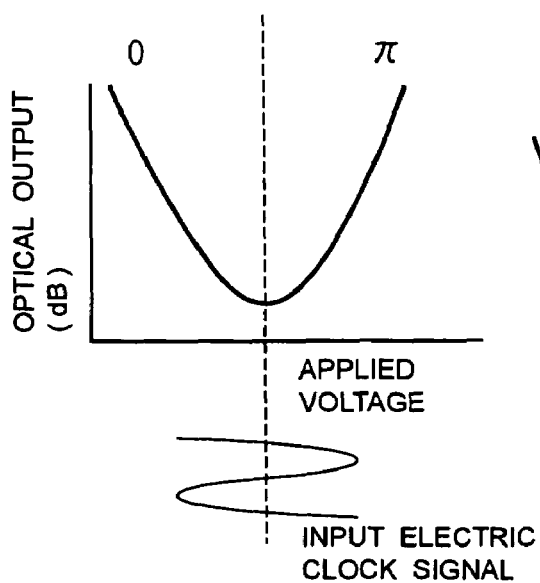
FIGS. 24A and 24B are diagrams for explaining the method of generating a clock signal in the CS-RZ modulation format with respect to a case where a center bias is shifted.
Figure 24B:
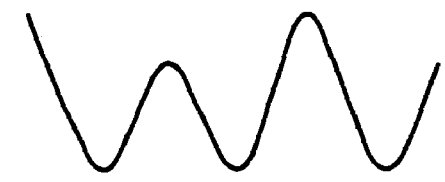
Figure 25:
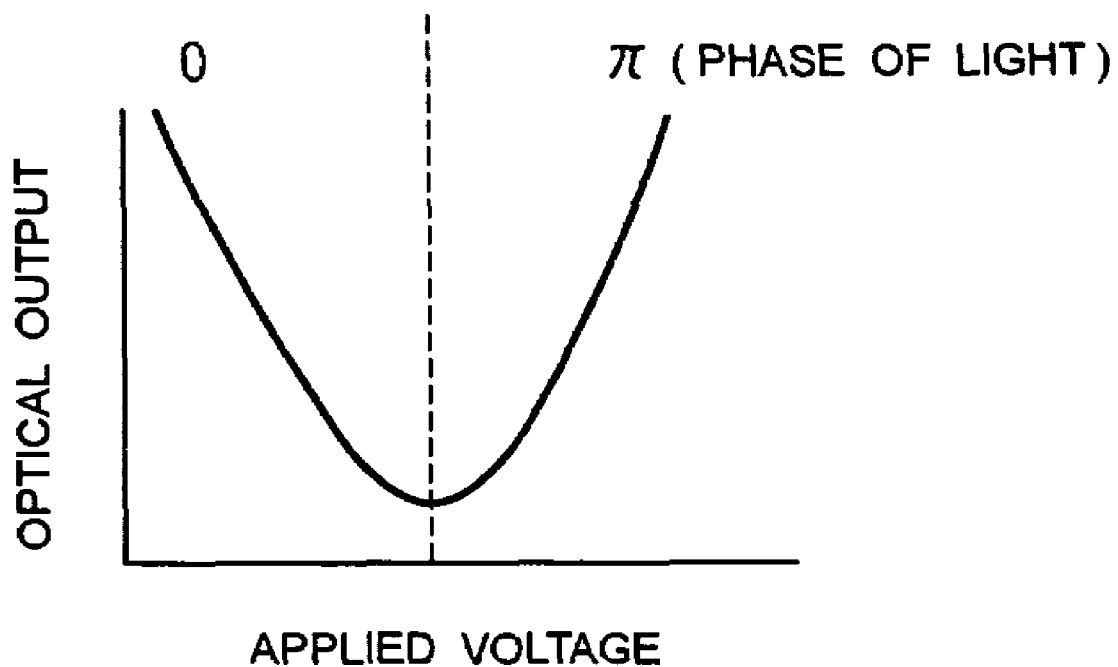
FIG. 25 is a diagram showing the relationship between the voltage applied to a Mach-Zehnder modulator and the optical output from the modulator.

FIG. 22 is a block diagram of an optical signal monitoring apparatus in the fifth embodiment of the present invention. FIGS. 23A and 23B are diagrams for explaining a method of generating a clock signal in the CS-RZ modulation format. FIGS. 24A and 24B are diagrams for explaining the method of generating a clock signal in the CS-RZ modulation format with respect to a case where a center bias is shifted. FIG. 25 is a diagram showing the relationship between the voltage applied to a Mach-Zehnder modulator and the optical output from the modulator.

In the CS-RZ modulation format, RZ-type waveform is ordinarily obtained in such a manner that, as shown in FIG. 22, an optical signal output from a continuous-wave (CW) light source 12 such as a DFB laser is passed through two modulators, a clock LN modulator 13 and a data modulator 14. To change the phase of light by $\pi$ between each adjacent pair of bits, in particular, a Mach-Zehnder type of LiNbO3 (LN) modulator is used. In this case, a sine wave electrical signal having a frequency half the frequency of the clock signal to be obtained is applied about a minimum value point at which the optical signal output stops decreasing and starts increasing (see FIG. 14) to generate clock pulses such as those shown in FIGS. 23A and 23B.

One problem in implementation of the CS-RZ modulation format resides in bias adjustment of the clock modulator.

Also, if the center of clock modulation is shifted, a signal in which each adjacent pair of bits can differ in height from each other is generated, as shown in FIGS. 24A and 24B.

Further, it is known that the clock LN modulator 13 has a drift of the modulation characteristic relative to the applied voltage, as shown in FIG. 25. Even if the bias voltage is fixed at a constant value, the above-mentioned height variation occurs between bits.

However, it is possible to accurately measure the height variation between bits due to a shift of the center bias in the clock LN modulator 13 by observing the optical signal output from the clock LN modulator 13 with the optical signal monitoring apparatus of the present invention. In this observation, there is a need to observe the envelops of the bits adjacent to each other. Therefore, the clock slot for control of timing of opening/closing of the optical gate 4 is set to a value 2N (N: a positive integer) times longer than the bit slot of the optical signal. In an optical transmitter electric circuit section 15, feedback control is performed on the bias voltages to the clock LN modulator 13 and the data modulator 14 by using the measured value, thereby stabilizing the modulated state.

The above-described control of the modulators is an application of control of the optical gate 4 at a frequency of f/N capable of obtaining waveform information on consecutive N bits in the optical signal monitoring apparatus.

Detection of height variation between each adjacent pair of bits and control of compensation for the variation can be performed as shown in FIG. 22.

The optical signal generated by the clock LN modulator 13 and the data modulator 14 is introduced into a branch path by the photocoupler 1, and the optical signal in the branch is input to the optical gate 4. The optical signal propagating in the branch path from the coupler 1 is input to the optical gate 4 driven, for example, by the same clock signal as that driving the clock LN modulator 13, i.e., the f/2 clock signal. The intensity of light which has passed through the optical gate 4 is measured with the photoelectric conversion element 5 while the amount of delay of the clock signal is being changed.

The optical transmitter electrical circuit section 15 determines that the bias voltage to the clock LN modulator 13 is correct if the maximum values of the envelops of each adjacent pair of bits are equal to each other. If the maximum values of the envelops are not equal to each other, the optical transmitter electrical circuit section 15 performs control for equalization of the values by changing the bias voltage.

Thus, a stable CS-RZ modulation format can be implemented by adding a simple monitoring function.

According to the present invention, waveform data is extracted directly from the optical signal waveform not limited to the frequency band. Therefore, a subtle change in optical signal waveform can be observed in a high-speed time region.

According to the present invention, high-rate sampling for every bit slot is performed by using the clock signal synchronized with the optical signal. So, a large amount of totalized data can be averaged in a short time. Therefore, the measurement time of a stable parameter extraction from an optical signal waveform can be reduced.

According to the present invention, only the discriminative features are extracted from a complicatedly degraded optical signal waveform. So, the size of extracted data is small and a process load required for analysis can be reduced. Therefore, the cost of an optical signal monitoring system can be reduced.

Further, since the apparatus in the present invention is consists of a small number of elements, the cost of an optical signal monitoring system can be reduced.

What is claimed is:

1. An apparatus for monitoring information on the waveform of an optical signal, comprising:
   a photocoupler which introduces an input optical signal into a branch path;

extraction means for extracting, from the optical signal introduced into the branch path by said optical coupler, a clock signal synchronized with the optical signal;

a optical gate which controls timing of opening and closing of a gate on the basis of the clock signal extracted by said extraction means to control transmission and non-transmission of the optical signal introduced into the branch path by said photocoupler;

adjustment means for adjusting the phase difference from the optical signal of the clock signal extracted by said extraction means;

detection means for detecting the intensity of light of the optical signal transmitted through said optical gate on the basis of the clock signal phase-difference-adjusted by said adjustment means; and waveform information extraction means for extracting information on the waveform of the optical signal on the basis of the light intensity detected by said detection means.

2. The apparatus according to claim 1, wherein said optical gate is constituted by an electro-absorption-type semiconductor modulator.

3. The apparatus according to claim 1, wherein said adjustment means is constituted by an optical delay circuit which is provided between said photocoupler and said optical gate, and which changes the delay time of the optical signal input to said optical gate.

4. The apparatus according to claim 1, wherein said adjustment means is constituted by an optical delay circuit which is provided between said photocoupler and said extraction means, and which changes the delay time of the optical signal input to said extraction means.

5. The apparatus according to claim 1, wherein said adjustment means is constituted by a delay circuit which changes the phase of the clock signal for controlling timing of opening and closing of said optical gate.

6. The apparatus according to claim 1, further comprising an optical receiver incorporating a clock extraction circuit, wherein said extraction means is constituted by said clock extraction circuit in said optical receiver.

7. The apparatus according to claim 1, further comprising means for extracting information on waveform degradation due to dispersion of the optical signal on the basis of the waveform information extracted by said waveform information extraction means.

8. The apparatus according to claim 1, further comprising a polarizing element between said photocoupler and said optical gate.

9. The apparatus according to claim 1, further comprising:
a polarization controller which controls the direction of polarization of the optical signal; and
a polarizing element which limits the direction of polarization of the optical signal to said optical gate, said polarization controller and said polarizing element being provided between said photocoupler and said optical gate.

10. The apparatus according to claim 1, further comprising a variable dispersion compensator which compensates for chromatic dispersion of the optical signal, wherein said waveform information extraction means is arranged to control said variable dispersion compensator on the basis of information on a chromatic dispersion value in the extracted waveform information.

11. The apparatus according to claim 1, further comprising a polarization mode dispersion compensator which compensates for polarization mode dispersion of the optical signal, wherein said waveform information extraction means is arranged to control said polarization mode dispersion compensator on the basis of information on a detected polarization direction dependence in the extracted waveform information.

12. A method of monitoring information on the waveform of an optical signal by using an optical signal monitoring apparatus having a optical gate, said method comprising:

a) a step of extracting from the optical signal a clock signal synchronized with the optical signal for the purpose of controlling timing of opening and closing of the optical gate;

b) a step of controlling transmission and non-transmission of the optical signal through the optical gate on the basis of the clock signal extracted in said step (a);

c) a step of adjusting the phase difference of the clock signal from the optical signal;

d) a step of detecting the intensity of light of the optical signal transmitted through the optical gate on the basis of the clock signal phase-difference-adjusted in said step (c); and e) a step of extracting information on the waveform of the optical signal on the basis of the light intensity detected in said step (d).

13. The method according to claim 12, wherein said step (b) includes a step of controlling the direction of polarization of the optical signal before control of transmission and non-transmission of the optical signal.

14. The method according to claim 12, wherein the optical signal monitoring apparatus further has an optical receiver, said step (e) including:

a step of extracting the rate of change in an optimum discrimination threshold level in the optical receiver from an amount of change in the waveform information; and a step of adjusting the discrimination threshold level in the optical receiver on the basis of the extracted amount of change.

15. The method according to claim 12, wherein said step (c) includes a step of detecting information on the optical waveform of consecutive N bits by performing control so that the frequency of the clock signal synchronized with the optical signal is 1/N (N: a positive integer) of the bit rate of the optical signal.

16. The method according to claim 12, wherein the optical signal monitoring apparatus further has an optical modulator, said method further comprising:

f) a step of measuring an intensity deviation between each adjacent pair of bits due to a shift of a center bias of the optical modulator; and g) a step of controlling the center bias of the optical modulator so that the intensity deviation measured in said step (f) becomes zero.

* * * * *